US010789722B2

(12) United States Patent
Wang et al.

(10) Patent No.: US 10,789,722 B2
(45) Date of Patent: Sep. 29, 2020

(54) PROCESSING IMAGES TO OBTAIN ENVIRONMENTAL INFORMATION

(71) Applicant: SZ DJI TECHNOLOGY CO., LTD., Shenzhen (CN)

(72) Inventors: Mingyu Wang, Shenzhen (CN); Zhenyu Zhu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 77 days.

(21) Appl. No.: 16/244,652

(22) Filed: Jan. 10, 2019

(65) Prior Publication Data

US 2019/0197710 A1 Jun. 27, 2019

Related U.S. Application Data

(63) Continuation of application No. PCT/CN2016/089814, filed on Jul. 12, 2016.

(51) Int. Cl.
*G06T 7/40* (2017.01)
*G06T 7/55* (2017.01)
*H04N 5/232* (2006.01)
*B64C 39/02* (2006.01)

(52) U.S. Cl.
CPC .............. *G06T 7/40* (2013.01); *G06T 7/55* (2017.01); *H04N 5/23296* (2013.01); *H04N 5/23299* (2018.08); *B64C 39/024* (2013.01); *B64C 2201/123* (2013.01); *G06T 2207/10032* (2013.01); *G06T 2207/30168* (2013.01); *G06T 2207/30261* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,819,016 A | * | 10/1998 | Watanabe | G01B 11/002 345/419 |
| 6,664,531 B2 | * | 12/2003 | Gartner | G01B 11/245 250/208.1 |
| 7,180,476 B1 | * | 2/2007 | Guell | G01S 19/15 340/980 |
| 8,937,646 B1 | * | 1/2015 | Baldwin | H04N 5/262 348/47 |

(Continued)

FOREIGN PATENT DOCUMENTS

| CN | 102435174 A | 5/2012 |
|---|---|---|
| CN | 102446355 A | 5/2012 |

(Continued)

OTHER PUBLICATIONS

The World Intellectual Property Organization (WIPO) International Search Report and Written Opinon for PCT/CN2016/089814 dated Mar. 30, 2017 7 Pages.

(Continued)

*Primary Examiner* — Zhiyu Lu
(74) *Attorney, Agent, or Firm* — Anova Law Group, PLLC

(57) ABSTRACT

Methods and systems for obtaining texture information and environmental information are provided. Texture information and/or environmental information may be obtained from various portions of captured images and may be utilized to improve operability of movable objects, such as unmanned aerial vehicles (UAVs).

20 Claims, 18 Drawing Sheets

(56) References Cited

U.S. PATENT DOCUMENTS

| | | | |
|---|---|---|---|
| 9,383,753 B1 | 7/2016 | Templeton et al. | |
| 2006/0244826 A1* | 11/2006 | Chew | G06K 9/3258 |
| | | | 348/143 |
| 2011/0242283 A1* | 10/2011 | Tyagi | G06T 7/521 |
| | | | 348/46 |
| 2013/0242086 A1 | 9/2013 | Brueckner et al. | |
| 2014/0125771 A1 | 5/2014 | Grossmann et al. | |
| 2016/0125239 A1* | 5/2016 | Danikhno | G06F 21/32 |
| | | | 348/78 |
| 2016/0125240 A1* | 5/2016 | Danikhno | G06K 9/00597 |
| | | | 348/78 |
| 2017/0264880 A1* | 9/2017 | Zolotov | G06T 7/10 |

FOREIGN PATENT DOCUMENTS

| | | |
|---|---|---|
| CN | 103559703 A | 2/2014 |
| DE | 10059891 A1 | 6/2002 |
| JP | 2001298656 A | 10/2001 |
| JP | 2007228448 A | 9/2007 |
| JP | 2010165142 A | 7/2010 |
| WO | 2016043897 A1 | 3/2016 |
| WO | 2016070318 A1 | 5/2016 |
| WO | 2016101155 A1 | 6/2016 |
| WO | 2016106715 A1 | 7/2016 |

OTHER PUBLICATIONS

Wheeler Frederick W. et al., Face Recognition at a Distance System for Surveillance Applications, 2010 Fourth IEEE International Conference, Sep. 27, 2017, IEEE, Piscataway, NJ, USA, pp. 1-8.

* cited by examiner

PROCESSING IMAGES TO OBTAIN ENVIRONMENTAL INFORMATION

CROSS-REFERENCE TO RELATED APPLICATION

This application is a continuation of International Application No. PCT/CN2016/089814, filed on Jul. 12, 2016, the entire content of which is incorporated herein by reference.

BACKGROUND

Imaging devices may be carried on board movable objects, such as unmanned aerial vehicles (UAVs), and be utilized for surveillance, search and rescue operations, exploration, and other activities. In some instances, images captured by the imaging devices may be utilized in computer vision processes, e.g. in navigation and obstacle avoidance.

One or more imaging components may be provided for capturing images. The captured images may be processed to obtain useful information for the movable objects. Existing approaches for processing the images may be less than optimal in some instances. For example, useful information contained in various parts of the images may be not utilized or may be underutilized. The usefulness of the movable objects may be improved by appropriately accounting for, and utilizing useful information contained in various parts of images captured by the imaging components.

SUMMARY

Presently, movable objects such as unmanned aerial vehicles (UAV) may inefficiently process images and unknowingly discard useful information contained in various parts of captured images. In some instances, the UAV may make suboptimal decisions in computer vision applications due to the inefficient processing. For example, for a vision system utilizing two imaging components, environmental information may be obtained based mostly on binocular disparity within captured images. For example, for a vision system utilizing a single imaging component, environmental information may be obtained based mostly on disparities within consecutively captured images.

Accordingly, a need exists for a UAV system that appropriately takes into account all available information within images for efficient acquisition of environmental information. The acquisition of environmental information may further enable the UAV to make better decisions in computer vision applications, e.g. navigation, object recognitions, and obstacle avoidance. For example, a binocular imaging system may be provided with imaging components with overlapping fields of views. The overlapping portion may be used to obtain environmental information while non-overlapping portions may be used as an alternative or supplement to obtain environmental information when beneficial. In another example, a monocular imaging system may be provided with an imaging component with a moving field of view. Overlapping portions of the moving field of view may be used to obtain environmental information while non-overlapping portions may be used as an alternative or supplement to obtain environmental information when beneficial. In another example, imaging components may be used as both part of a monocular imaging system and a binocular imaging system. For example, a system may be provided with imaging components with different fields of views. An imaging component with a small field of view may be used individually or in conjunction with an imaging component with the large field of view to obtain environmental information while the imaging component with a large field of view may be used as an alternative or supplement to obtain environmental information when beneficial.

Thus, in one aspect, a method of processing images captured by a movable object is provided. The method comprises: capturing a first image set with a first imaging component, wherein the first imaging component has a first field of view; capturing a second image set with a second imaging component, wherein the second imaging component has a second field of view overlapping with the first field of view; with aid of one or more processors, individually or collectively, processing a non-overlapping portion of the first image set and the second image set to obtain texture information; and generating a control signal to adjust the first imaging component and/or the second imaging component based on the texture information.

In another aspect, a system for processing images captured by a movable object is provided. The system comprises: one or more processors, individually or collectively configured to: process a first image set to obtain texture information if a second image set has a quality below a predetermined threshold, wherein the first image set is captured by a first imaging component having a first field of view and wherein the second image set is captured by a second imaging component having a second field of view narrower than the first field of view; and obtain environmental information for the movable object based on the texture information.

In another aspect, an apparatus for processing images captured by a movable object is provided. The apparatus comprises: a first imaging component having a first field of view, wherein the first imaging component is configured to capture a first image set; a second imaging component having a second field of view narrower than the first field of view, wherein the second imaging component is configured to capture a second image set; and one or more processors, individually or collectively configured to: process the first image set to obtain texture information if the second image set has a quality below a predetermined threshold; and obtain environmental information for the movable object based on the texture information.

In another aspect, a non-transitory computer readable medium for processing images captured by a movable object is provided. The computer readable medium comprises code, logic, or instructions to: capture a first image set with a first imaging component, wherein the first imaging component has a first field of view; capture a second image set with a second imaging component, wherein the second imaging component has a second field of view narrower than the first field of view; with aid of one or more processors, individually or collectively, process the first image set to obtain texture information if the second image set has a quality below a predetermined threshold; and obtain environmental information for the movable object based on the texture information.

In another aspect, a method of processing images captured by a movable object is provided. The method comprises: capturing a first image set with a first imaging component, wherein the first imaging component has a first field of view; capturing a second image set with a second imaging component, wherein the second imaging component has a second field of view overlapping with the first field of view; with aid of one or more processors, individually or collectively, processing a non-overlapping portion of the first image set and the second image set to obtain texture information; and generating a control signal to adjust the first imaging component and/or the second imaging component based on the texture information.

In another aspect, a system for processing images captured by a movable object is provided. The system comprises: one or more processors, individually or collectively configured to: process a non-overlapping portion of a first image set and a second image set to obtain texture information, wherein the first image set is captured by a first imaging component having a first field of view and the second image set is captured by a second imaging component having a second field of view overlapping with the first field of view; and generate a control signal to adjust the first imaging component and/or the second imaging component based on the texture information.

In another aspect, an apparatus for processing images captured by a movable object is provided. The apparatus comprises: a first imaging component having a first field of view, wherein the first imaging component is configured to capture a first image set; a second imaging component having a second field of view overlapping with the first field of view, wherein the second imaging component is configured to capture a second image set; and one or more processors, individually or collectively configured to: process a non-overlapping portion of the first image set and the second image set to obtain texture information; and generate a control signal to adjust the first imaging component and/or the second imaging component based on the texture information.

In another aspect, a non-transitory computer readable medium for processing images captured by a movable object is provided. The computer readable medium comprises code, logic, or instructions to: capture a first image set with a first imaging component, wherein the first imaging component has a first field of view; capture a second image set with a second imaging component, wherein the second imaging component has a second field of view overlapping with the first field of view; with aid of one or more processors, individually or collectively, process a non-overlapping portion of the first image set and the second image set to obtain texture information; and generate a control signal to adjust the first imaging component and/or the second imaging component based on the texture information.

In another aspect, a method for processing images captured by a movable object is provided. The method comprises: capturing a sequence of images with an imaging component, wherein the sequence of images comprise overlapping portions; with aid of one or more processors, individually or collectively, processing a non-overlapping portion of the sequence of images to obtain texture information; and obtaining environmental information for the movable object based on the texture information.

In another aspect, a system for processing images captured by a movable object is provided. The system comprises: one or more processors, individually or collectively configured to: process a non-overlapping portion of a sequence of images to obtain texture information, wherein the sequence of images are captured by an imaging component and comprise overlapping portions; and obtain environmental information for the movable object based on the texture information.

In another aspect, an apparatus for processing information from images for a movable object is provided. The apparatus comprises: an imaging component configured to capture a sequence of images, wherein the sequence of images comprise overlapping portions; and one or more processors, individually or collectively configured to: process a non-overlapping portion of the sequence of images to obtain texture information; and obtain environmental information for the movable object based on the texture information.

In another aspect, a non-transitory computer readable medium for processing information from images is provided. The computer readable medium comprises code, logic, or instructions to: capture a sequence of images with an imaging component, wherein the sequence of images comprise overlapping portions; with aid of one or more processors, individually or collectively, process a non-overlapping portion of the sequence of images to obtain texture information; and obtain environmental information for the movable object based on the texture information.

It shall be understood that different aspects of the present disclosure can be appreciated individually, collectively, or in combination with each other. Various aspects of the present disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the present invention are set forth with particularity in the appended claims. A better understanding of the features and advantages of the present disclosure will be obtained by reference to the following detailed description that sets forth illustrative embodiments, in which the principles of the present disclosure are utilized, and the accompanying drawings of which:

DETAILED DESCRIPTION

Figure 1A:
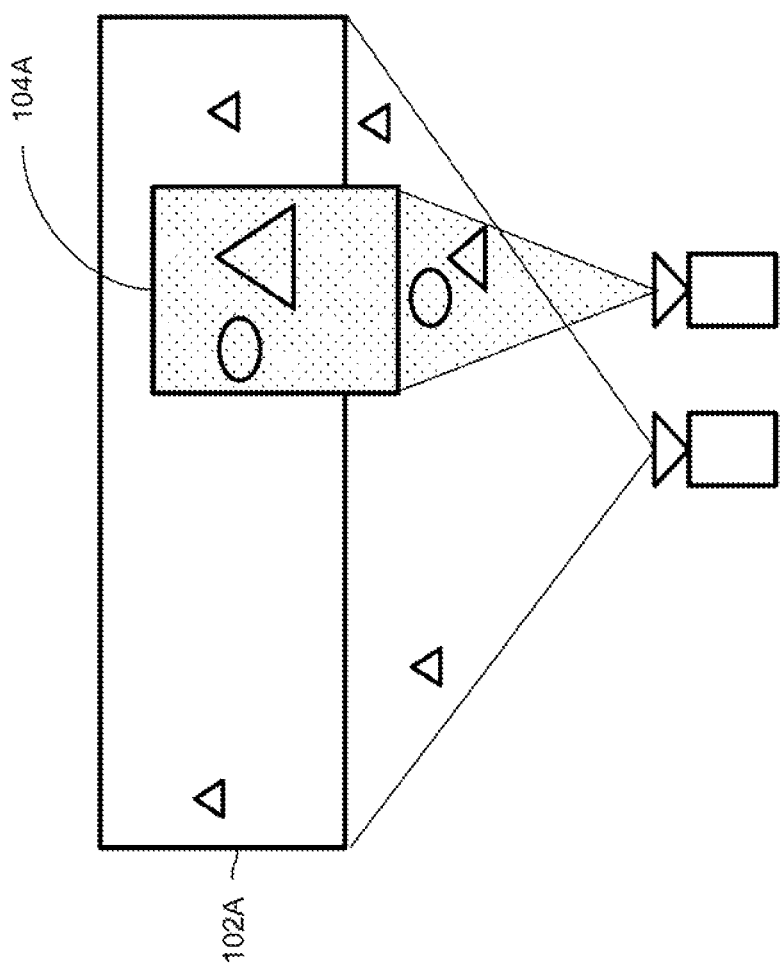
FIGS. 1A-1C illustrate images of a scene captured by an imaging system.

Systems, methods, devices, and computer readable media provided herein may be used to improve usefulness of images captured by imaging components. For example, the systems provided herein may enable one or more processors to obtain environmental information from parts of the images that would normally be discounted. Alternatively or in addition, the system provided herein may enable one or more processors to obtain a greater amount of environmental information from one or more images captured by the imaging components. The obtained environmental information may further be utilized in the context of computer vision applications and improve an overall performance and/or efficiency of vehicles, such as aerial vehicles. The aerial vehicles as used herein may refer to an unmanned aerial vehicle (UAV), or any other type of movable object. Accordingly, it is to be understood that embodiments described with respect to UAVs may be applicable to any other type of movable object.

In some instances, a system may be provided with imaging components with different fields of views. An imaging component with a small field of view may be used individually or in conjunction with an imaging component with the large field of view to obtain environmental information while the imaging component with a large field of view may be used as an alternative or supplement to obtain environmental information when beneficial. The obtained environmental information may enable movable object to recognize objects, avoid obstacles, or calculate a state information (e.g., velocity, position) of the movable object with greater accuracy and/or efficiency.

In some instances, an imaging system may be provided with imaging components with overlapping fields of views. The overlapping portion may be used to obtain environmental information while non-overlapping portions may be used as an alternative or supplement to obtain environmental information when beneficial. The obtained environmental information may enable movable object to recognize objects, avoid obstacles, or calculate a state information (e.g., velocity, position) of the movable object with greater accuracy and/or efficiency.

In some instances, a monocular imaging system may be provided with an imaging component with a moving field of view. Overlapping portions of the moving field of view may be used to obtain environmental information while non-overlapping portions may be used as an alternative or supplement to obtain environmental information when beneficial. The obtained environmental information may enable movable object to recognize objects, avoid obstacles, or calculate a state information (e.g., velocity, position) of the movable object with greater accuracy and/or efficiency.

In some instances, imaging components may be used as both part of a monocular imaging system and a binocular imaging system. For example, a system may be provided with imaging components with different fields of views. An imaging component with a small field of view may be used individually or in conjunction with an imaging component with the large field of view to obtain environmental information while the imaging component with a large field of view may be used as an alternative or supplement to obtain environmental information when beneficial. The obtained environmental information may enable movable object to recognize objects, avoid obstacles, or calculate a state information (e.g., velocity, position) of the movable object with greater accuracy and/or efficiency.

It shall be understood that different aspects of the present disclosure can be appreciated individually, collectively, or in combination with each other. Various aspects of the present disclosure described herein may be applied to any of the particular applications set forth below or for any other types of remotely controlled vehicles or movable objects.

Figure 1B:
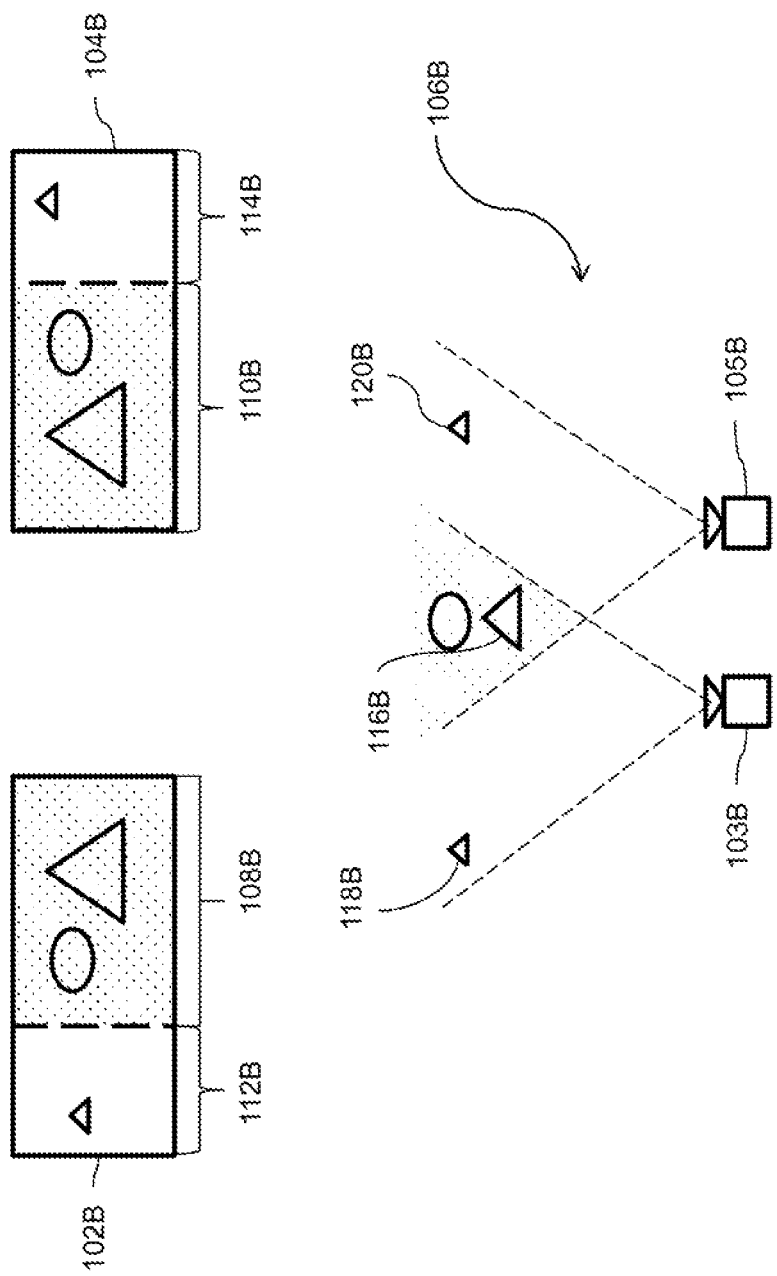
Figure 1C:
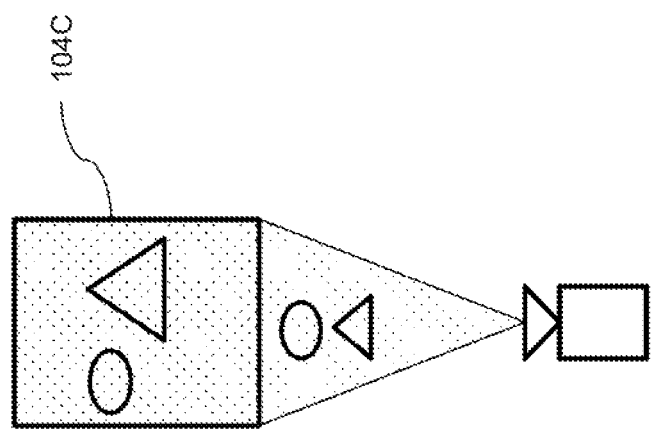
Figure 1C:
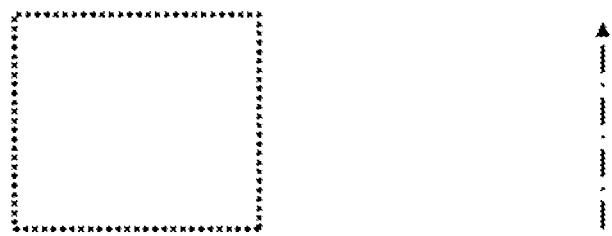
Figure 1C:
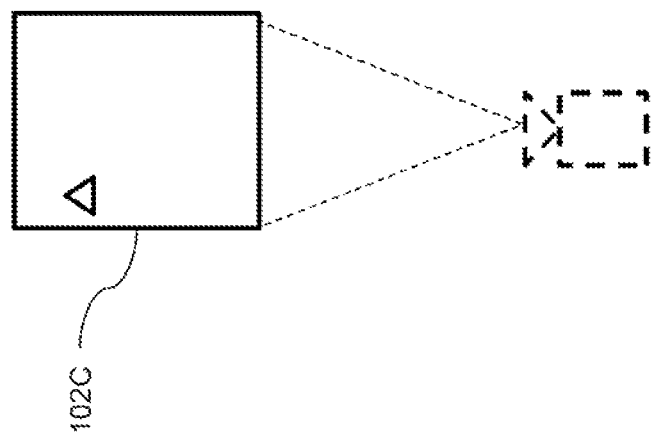

FIGS. 1A-1C illustrate various imaging systems for obtaining environmental information. FIG. 1A illustrates images 102A and 104A of a scene captured by an imaging system. In some instances, the imaging system may capture images 102A having a wider field of view and images 104A having a narrower field of view. FIG. 1B illustrates images 102B and 104B of a scene 106B captured by an imaging system. In some instances, the imaging system may be configured to capture images with overlapping fields of views. FIG. 1C illustrates images 102C and 104C of a scene captured by an imaging system. In some instances, the imaging system may be configured to capture images of different fields of views over different time points. For example, the imaging system may be a moving imaging system that captures differing scenes at different times.

The imaging systems may utilize imaging components, e.g. for capturing of images. The imaging component(s) may be operably coupled to a UAV. In some instances, the imaging component(s) may be embedded in the UAV. Alternatively or in addition, the imaging component(s) may be coupled to the UAV via a mechanism. In some instances, the mechanism may permit movement of the imaging component relative to the UAV. The movement may comprise translational movement and/or rotational movement. In some instances, the mechanism may comprise a gimbal. The gimbal may be configured to permit movement of the imaging component about one, two, or three axes.

In some instances, each of the captured images may be processed in order to obtain environmental information. Environmental information may refer to any information useful for operation of the UAV. For example, environmental information may comprise a depth and/or distance information for the UAV (e.g. distance to an object). As another example, environmental information may comprise object information or obstacle information for the UAV. As another example, environmental information may comprise UAV state information such as UAV position, UAV orientation, UAV velocity, and/or UAV acceleration information. As another example, environmental information may comprise other information regarding the environment such as temperature, humidity, precipitation, etc. In some instances, environmental information may refer to information that affects a behavior of the UAV. For example, environmental information may lead to a change in state of the UAV, such as a change in position, altitude, orientation, velocity, acceleration, etc. In some instances, environmental information may refer to information taken into account for governing a behavior of the UAV. As an example, one or more processors operably coupled to the UAV may utilize the environmental information for navigation, object detection, obstacle avoidance, etc.

In some instances, obtaining environmental information may comprise obtaining texture information of the captured images. The texture information may provide information regarding a spatial arrangement of color or intensities in an image. For example, the texture information may include color gradients, edges, feature points and optical flows that may be obtained using various appropriate algorithms. The texture information may be obtained from both overlapping and/or non-overlapping portions of the sequence of images obtained by imaging component. In some instances, the texture information may be utilized as a basis for obtaining environmental information for the UAV. As one example, based on texture information (e.g. color or intensities within an image), insight regarding an environment the UAV is operating in may be obtained. For example, based on the texture information, such as feature points (e.g. corner points), determination that there are objects or obstacles within the environment the UAV is operating may be obtained.

In some instances, the texture information contained in the image with a wider field of view may be processed if a data quality in the image with the narrower field of view is not enough for obtaining the environmental information, e.g. below a predetermined threshold. In some instances, the data quality in the image with the narrower field of view may be below the predetermined threshold depending on whether there is sufficient data or information within the image, e.g. if there are identifiable features within the image. In some instances, the data quality in the image may be below the predetermined threshold if a distance or depth information cannot be obtained for the UAV. In some instances, the data quality in the image may be below the predetermined threshold if a state information for the UAV cannot not be obtained. In some instances, the threshold for determining the data quality in the image may be configured differently for different methods used for obtaining the environmental information.

Referring back to FIG. 1A, the images 102A, 104A may be an example of images captured by discrete imaging components simultaneously or in sequence. In some instances, the images may comprise differing fields of views. For example, the image 102A may comprise a narrower field of view. The image 104A may comprise a wider field of view. In some instances, the image with the narrower field of view may overlap with the image with the wider field of view. In some instances, the image with the narrower field of view may be encompassed by the image with the wider field of view. The captured images may be processed by one or more processors.

In some instances, the data contained in the image with a narrower field of view may be utilized in obtaining the environmental information for the UAV. In some instances, data contained in the images with the narrower field of view may be processed by one or more processors operably coupled to the UAV to obtain distance information for the UAV. In some instances, data contained in an overlapping portion of image 102A and 104A may be utilized in obtaining environmental information for the UAV, as further described below.

In some instances, data contained in the images with the wider field of view may not be utilized or contribute to obtaining environmental information for the UAV. As one example, data contained within image 102A (or a non-overlapping portion of image 102A) may not be processed by one or more processors operably coupled to the UAV in obtaining distance information for the UAV.

The image with the wider field of view may contain useful information for operation of the UAV. In some instances, the image with the wider field of view may be processed to obtain environmental information for the UAV. For example, one or more processors operably coupled to the UAV may process data contained in the image with the wider field of view. In some instances, one or more processors operably coupled to the UAV may process data contained in the image with the wider field of view to obtain texture information. In some instances, one or more processors operably coupled to the UAV may process data contained in the image with the wider field of view to obtain environmental information. Optionally, the environmental information may be obtained based on the texture information obtained from the image with the wider field of view. In some instances, one or more processors operably coupled to the UAV may process data contained in the image with the wider field of view in conjunction with processing data contained in the image with the narrower field of view. In some instances, the one or more processors may process data contained in the image with the wider field of view selectively. For example, the data contained in the image with the wider field of view may be processed if a data quality in the image with the narrower field of view is below a predetermined threshold. In some instances, the data quality in the image with the narrower field of view may be below the predetermined threshold depending on whether there is sufficient data or information within the image, e.g. if there are identifiable features within the image. In some instances, the data quality in the image may be below the predetermined threshold if a distance or depth information cannot be obtained for the UAV. In some instances, the data quality in the image may be below the predetermined threshold if a state information for the UAV cannot not be obtained.

Referring back to FIG. 1B, the images 102B, 104B may be an example of images captured by discrete imaging components simultaneously. Alternatively, the images may be an example of a sequence of images captured by a single imaging component over time. Images 102B and 104B may collectively capture a scene or field of view 106B. The collective field of view may be larger than a single scene captured by either image 102B or 104B. The captured images may be processed by one or more processors.

In some instances, data contained in overlapping portions of images may be utilized in obtaining the environmental information for the UAV. In some instances, data contained in overlapping portions 108B and 110B may be processed by one or more processors operably coupled to the UAV to obtain distance information for the UAV. For example, a distance from the UAV to object 116B may be obtained by comparing a disparity between common features (e.g. the object) within images 102B and 104B. The common features may necessarily be features included in an overlapping portion of the images. As another example, data or features contained within portion 108B and its relative placement within image 102B may be compared to data or features contained within portion 110B and its relative placement within image 104B in order to obtain distance information for the UAV.

Data contained in non-overlapping portions of images may not be utilized or contribute to obtaining environmental information for the UAV. As one example, data contained within non-overlapping portions 112B and 114B may not be processed by one or more processors operably coupled to the UAV in obtaining distance information for the UAV. For example, features or objects 118B, 120B contained within the images may not be utilized in obtaining environmental information for the UAV. In some instances, objects 118B or 120B may not be taken into consideration in affecting a behavior of the UAV.

The non-overlapping portions may contain useful information for operation of the UAV. In some instances, the non-overlapping portions may be processed to obtain environmental information for the UAV. For example, one or more processors operably coupled to the UAV may process data contained in the non-overlapping portions. In some instances, one or more processors operably coupled to the UAV may process data contained in the non-overlapping portions to obtain texture information. In some instances, one or more processors operably coupled to the UAV may process data contained in the non-overlapping portions to obtain environmental information. Optionally, the environmental information may be obtained based on the texture information obtained from the non-overlapping portion of the images. In some instances, one or more processors operably coupled to the UAV may process data contained in the non-overlapping portions in conjunction with processing data contained in the overlapping portions. For example, environmental information may be obtained from both the overlapping portions of the images and the non-overlapping portions of the images. In some instances, the one or more processors may process data contained in the non-overlapping portions selectively. For example, the data contained in the non-overlapping portions may be processed if a data quality in the overlapping portions is below a predetermined threshold. In some instances, the data quality in the overlapping portions may be below the predetermined threshold depending on whether there is sufficient data or information within the overlapping portion, e.g. if there are identifiable features within the overlapping portions. In some instances, the data quality in the overlapping portions may be below the predetermined threshold if a distance or depth information cannot be obtained for the UAV. In some instances, the data quality in the overlapping portions may be below the predetermined threshold if a state information for the UAV cannot not be obtained. In some instances, the data quality in the overlapping portions may be below the predetermined threshold if a number of feature points within the overlapping portions is equal to or less than about 2, 5, 10, 20, 30, 40, 50, 60, 70, 80, 90, 100, 120, 140, 160, 180, 200, 250, or 300.

Referring back to FIG. 1C, the images 102C, 104C may be an example of images captured by an imaging component in sequence. In some instances, the sequence of images may comprise differing fields of views or and/or differing scenes. In some instances, the image captured in sequence may comprise overlapping portions. The captured images may be processed by one or more processors.

In some instances, data contained in overlapping portions of the sequence of images may be utilized in obtaining the environmental information for the UAV. In some instances, data contained in overlapping portions may be processed by one or more processors operably coupled to the UAV to obtain distance information for the UAV. For example, a distance from the UAV to object may be obtained by comparing a disparity between common features (e.g. the object) within the sequence of images. The common features may necessarily be features included in an overlapping portion of the sequence of images.

Data contained in non-overlapping portions of the sequence of images may not be utilized or contribute to obtaining environmental information for the UAV. As one example, data contained within non-overlapping portions of the sequence of images may not be processed by one or more processors operably coupled to the UAV in obtaining distance information for the UAV. In some instances, objects in non-overlapping portions of the sequence of images may not be taken into consideration in affecting a behavior of the UAV.

The non-overlapping portions may contain useful information for operation of the UAV. In some instances, the non-overlapping portions may be processed to obtain environmental information for the UAV. For example, one or more processors operably coupled to the UAV may process data contained in the non-overlapping portions. In some instances, one or more processors operably coupled to the UAV may process data contained in the non-overlapping portions to obtain texture information. In some instances, one or more processors operably coupled to the UAV may process data contained in the non-overlapping portions to obtain environmental information. Optionally, the environmental information may be obtained based on the texture information obtained from the non-overlapping portion of the images. In some instances, one or more processors operably coupled to the UAV may process data contained in the non-overlapping portions in conjunction with processing data contained in the overlapping portions. For example, environmental information may be obtained from both the overlapping portions of the images and the non-overlapping portions of the images. In some instances, the one or more processors may process data contained in the non-overlapping portions selectively. For example, the data contained in the non-overlapping portions may be processed if a data quality in the overlapping portions is below a predetermined threshold. In some instances, the data quality in the overlapping portions may be below the predetermined threshold depending on whether there is sufficient data or information within the overlapping portion, e.g. if there are identifiable features within the overlapping portions. In some instances, the data quality in the overlapping portions may be below the predetermined threshold if a distance or depth information cannot be obtained for the UAV. In some instances, the data quality in the overlapping portions may be below the predetermined threshold if a state information for the UAV cannot not be obtained.

Figure 2:
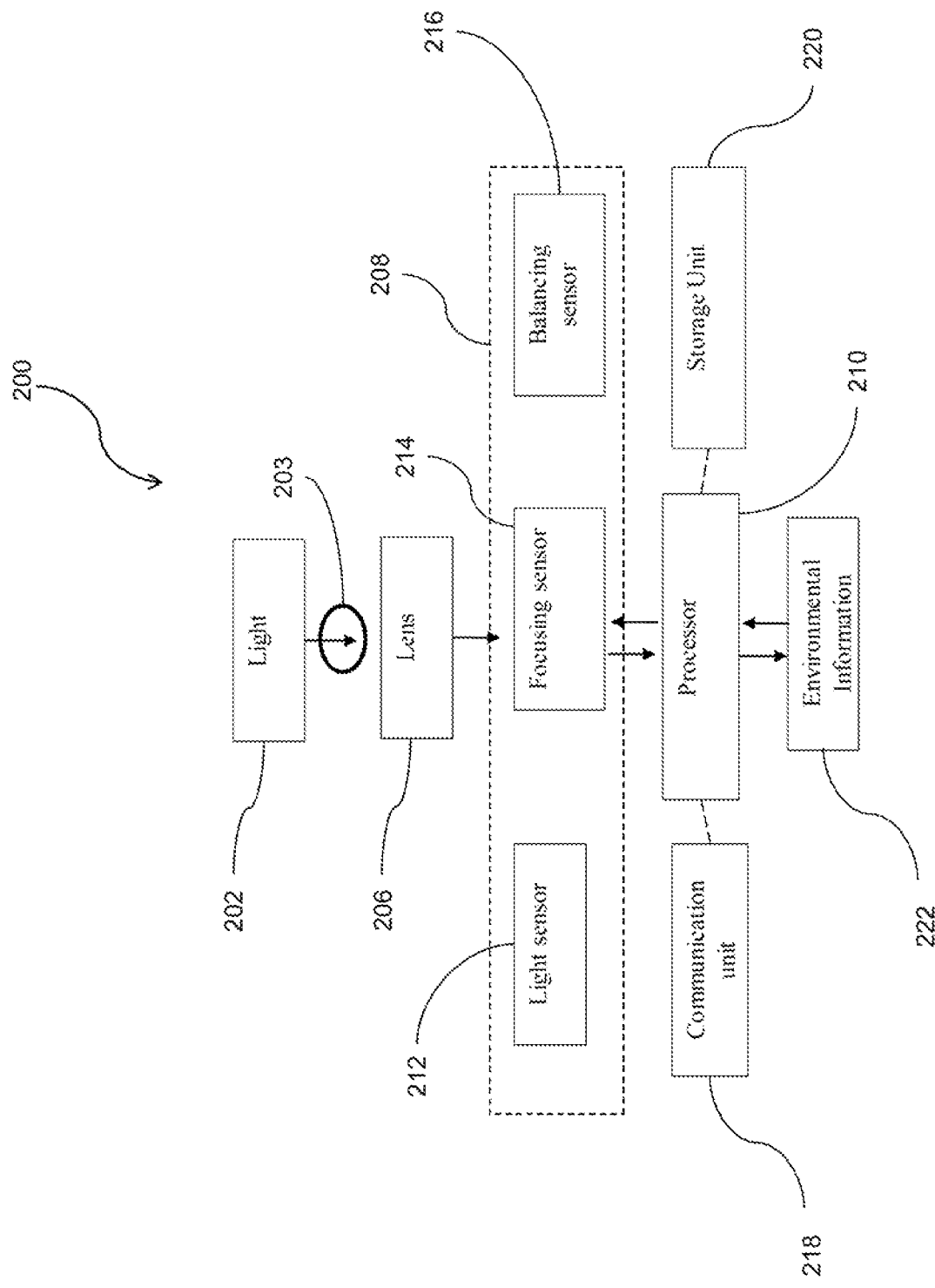
FIG. 2 illustrates exemplary systems used to obtain environmental information, in accordance with embodiments.

FIG. 2 illustrates exemplary systems used to obtain environmental information, in accordance with embodiments. The system 200 may intake light 202 and obtain environmental information 222. The system may comprise various components for capturing one or more images (e.g. digital images). In some instances, the various components, individually or collectively, may be referred to as an imaging component. For example, an aperture of an imaging device, lens, filters, and/or sensors, may be an imaging component. As another example, an imaging device may be referred to as an imaging component. In some instances, an imaging component may refer to at least a lens configured to direct light and a corresponding sensor to capture the directed light. Each of the components may be located at a same location. For example, each component of the system may be enclosed in a single housing, e.g. in an imaging device. Alternatively, the components may be located at different locations. For example, the system may comprise a plurality of discrete parts located at different locations working together. As an example, the system may comprise two or more cameras and other optical elements working in conjunction. As another example, some of the components may be located on board an imaging device while other components may be integrated with the UAV and/or on a controller off-board the UAV.

The system may comprise an aperture 203 through which light may enter. The light may enter through a single aperture. In some embodiments, light may enter through a plurality of apertures, such as two, three, four, five or more apertures. The system may comprise one or more lenses 206. The lens may direct the light beam to an image sensor that captures the directed light beam (e.g., captures image data). In some instances, the system may comprise a lens barrel configured to receive one or more lenses. The lens barrel may house the one or more lenses. In some instances, the lens barrel may be used to adjust a focal length of the system by adjusting a distance between the one or more lenses. Optionally, other optical elements, such as mirrors, filters, gratings, additional lenses, or dichroics, may be provided that may aid in directing light to the image sensor.

Each lens may have a corresponding focal length or a focal length range. A focal length range may include multiple focal lengths falling within a lower limit and an upper limit of the range. In some instances, a focal length range may include a single focal length. The single focal length may serve as both the lower limit and the upper limit of the range. As used herein, it is to be understood that focal length and focal length range may be used interchangeably. A focal length of a lens may measure how strongly the lens converges or diverges light. The focal length of an optical lens may refer to the distance over which initially collimated rays are brought to a focus.

A lens may be a prime lens or a zoom lens. A prime lens may have a fixed, single focal length. A prime lens may refer to a stationary lens that does not move. A zoom lens may have variable focal lengths and the focal length may encompass a plurality of focal lengths (e.g., focal length range). An optical zoom lens may vary the focal length by a relative movement of a set of internal lens elements. In some embodiments, the imaging component may comprise only prime lenses. In some embodiments, the imaging component may comprise both a prime lens and a zoom lens. In some embodiments, the imaging component may comprise only zoom lenses.

In some instances, a focal length of a prime lens may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. Optionally, the focal length of a prime lens suitable may be greater than or equal to any of the values described herein. The focal length of a prime lens may have a value falling within a range between any two of the values described herein.

The system may comprise one or more sensors 208. The light focused by the lens may be directed onto the one or more sensors, also referred to herein as an image sensor. For example, the system may comprise a light sensor 212 with photosites to collect and store photons. The light sensor may further convert the collected information (e.g., photons) to a digital form (e.g., capturing an image). For example, the system may comprise a focusing sensor 214 to determine a correct focus of an image that is to be captured. For example, the system may comprise a balancing sensor (e.g., a white balance sensor) 216 to balance color of a captured image (e.g., to match that of human vision or to optimize for computer vision applications). In some instances, one image sensor 208 may comprise functions of a plurality of different types of sensors. For example, one sensor may be used to detect and convey light into a form that conveys an image (e.g., capture an image) as well as focus and balance the image (e.g., white balance).

The image sensor may be at a predetermined distance away from the lens. For example, the distance from the image sensor to the lens module may correspond to the focal length of the lens module. In some instances, the image sensor may have a variable distance to the lens module (e.g., zoom lens). The image sensor may be positioned such that a focal plane of the captured image is coplanar with the image sensor plane.

The image sensor may refer to a device that converts optical information (e.g., light striking the sensor surface may comprise optical information) into digital information (e.g., electronic signals). Converting optical information into digital information may herein be referred to as capturing an image (e.g., image data). An image sensor may detect and convey information that constitutes an image. The image sensors may be of a charge-coupled devices (CCD) type, a complementary metal-oxide-semiconductor (CMOS) type, an N-type metal-oxide-semiconductor (NMOS) type, or a back-side illuminated CMOS (BSI-CMOS) type.

Figure 3:
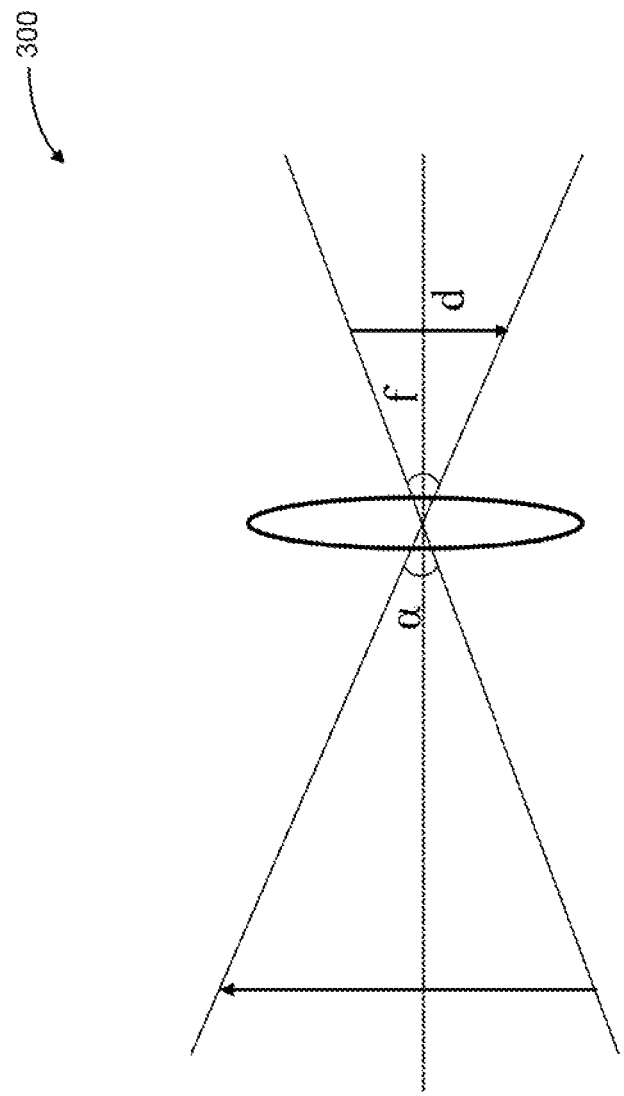
FIG. 3 illustrates field of view angle of an optical lens, in accordance with embodiments.

In some instances, the imaging component (e.g. lens, sensors, etc) of the system may comprise an optical axis. An optical axis may refer to a line along which there is some degree of rotational symmetry. The optical axis may be defined by a line along which light propagates through the lens. The optical axis may pass through a center of the lens, or imaging component. In some instances, the imaging component may have a field of view (FOV) associated with it. A FOV may refer to a part of the world that is visible on an imaging system at a particular position and orientation in space. Objects outside the FOV when an image is taken may not be recorded in a photograph. FOV may also be expressed as an angular size of the view cone, or as an angle of view. A FOV of an optical module may depend on the sensor size and the focal length. FIG. 3 illustrates field of view angle of an optical lens 300, in accordance with embodiments. For the optical lens, the field of view angle $\alpha$ can be calculated as FOV $\alpha=2$ arctan (d/2f), where d is image sensor size, and f is focal length of the lens.

For an image sensor having a fixed size, a prime lens may have a fixed FOV and the FOV may encompass a single FOV angle. For an image sensor having a fixed size, a zoom lens may have variable FOV angular range and the FOV angular range may encompass a plurality of FOV angles. The FOV may depend on one or more lenses and/or other optical elements (e.g., sensor) of the optical modules. In some instances, a FOV of a prime lens may be less than or equal to 180°, 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, or 15°. Optionally, the FOV of a prime lens may be greater than or equal to any of the values described herein. The FOV of a prime lens may have a value falling within a range between any two of the values described herein.

The imaging component(s) may capture images of an environment (e.g., near or around the imaging system). The imaging component(s) may continuously capture images. The imaging component(s) may capture images at a specified frequency to produce a series of image data over time. The imaging component(s) may capture images at a high enough frequency to provide video-rate capturing. Images may be captured at a rate of at least 10 Hz, 20 Hz, 30 Hz, 40 Hz, 50 Hz, 60 Hz, 70 Hz, 80 Hz, 90 Hz, 100 Hz, 120 Hz, 150 Hz, 200 Hz, 250 Hz, or 300 Hz.

The system of FIG. 2 may optionally comprise a communication unit 218 and/or storage unit 220. A communication unit may be used for communication with external components and/or devices, e.g., mobile devices such as mobile phones, tablets, PCs, remote controllers, etc. The communication unit, for example, may be used in sending images captured by the imaging system (e.g., output), or receiving inputs (e.g., control signals) from the external components or devices. The communication unit may also be used to transform images via digital signal processing (DSP) to improve captured images (e.g., by the image sensor) in some way. The storage unit may be used for temporarily or permanently storing image(s) captured by the system.

The system of FIG. 2 may further comprise a processor 210. The processor may process the captured images and/or perform image processing functions such as black level correction, surrounding light ratio correction, distortion correction, white balance correction, color crosstalk correction, de-mosaic, color correction, gray scale mapping, color space conversion, sharpening, and noise removal. In some instances, the processor may process the captured images to obtain environmental information 222, as further described below.

The processor may be provided onboard a movable object, such as a UAV or a mobile phone. In some instances, the processor may be provided on board an imaging device of the movable object. The processor may be within or outside a housing of the imaging device. In some instances, the processor may be provided off-board the imaging device of the movable object. The processor may be provided on a carrier, such as a gimbal, further described below. Alternatively, the processor may be provided remote to the movable object. For instance, the processor may be provided on a remote controller (e.g., cell phone, PDA, etc), server, ground station (e.g., desktop computer, laptop, charging station, etc), or cloud-based infrastructure. Information from one or more optical modules may be wirelessly transmitted to the processor. Alternatively, information from the imaging component may be provided to the processor via a physical connection. The processor 210 may be implemented by a Central Processing Unit (CPU), Application Specific Integrated Circuit (ASIC), or Field Programmable Gate Array (FPGA). Any description herein of a processor may apply to one or more processors, which may individually or collectively perform any functions described for the processor. The processor may include a single or multiple processors. The processor may be capable of executing one or more steps in accordance with non-transitory computer readable media comprising code, logic, or instructions for performing one or more steps. Memory storage units may be provided which may comprise the non-transitory computer readable media.

Figure 4:
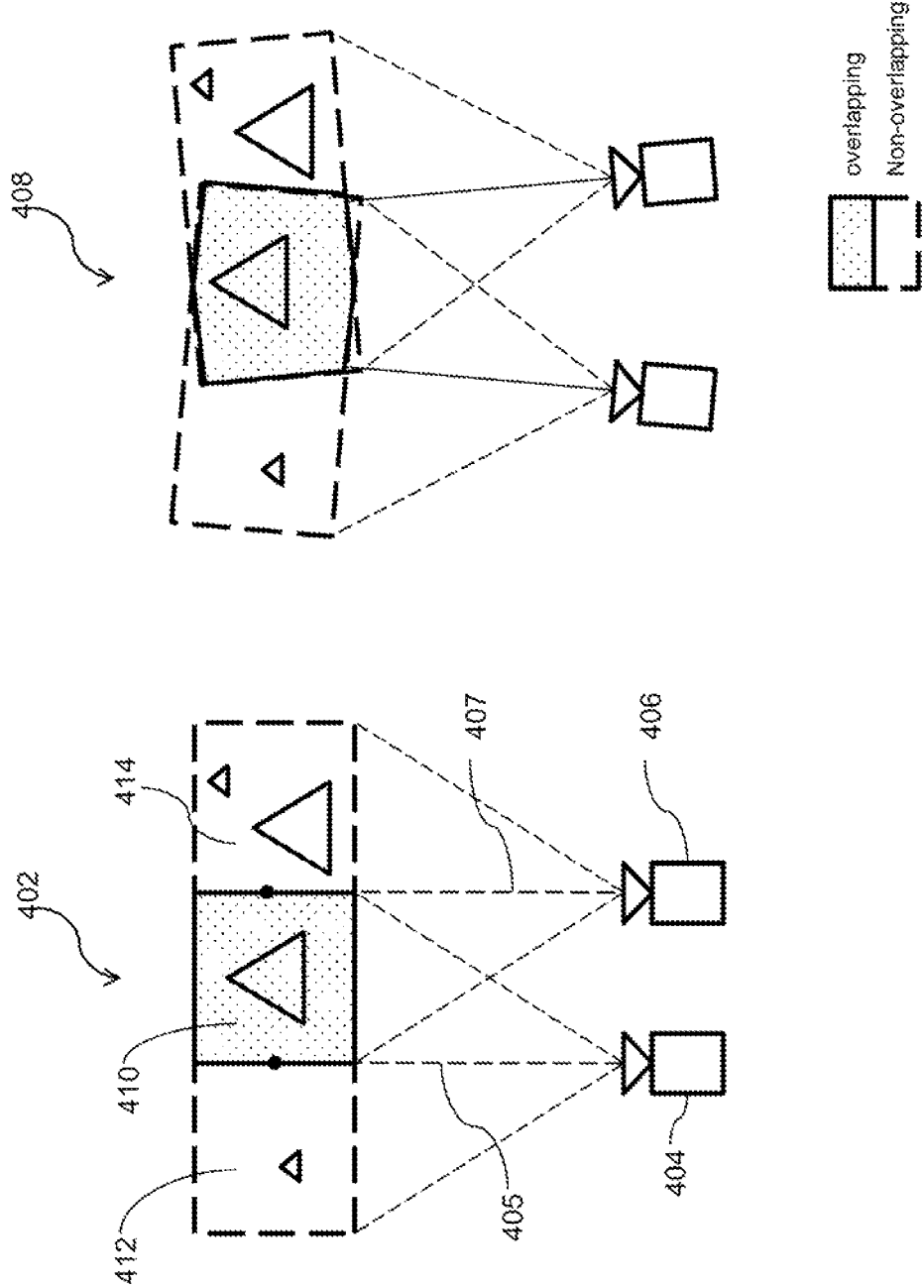
FIG. 4 illustrates binocular imaging systems used to obtain environmental information, in accordance with embodiments.

FIG. 4 illustrates binocular imaging systems used to obtain environmental information, in accordance with embodiments. In configuration 402, an imaging system with a first imaging component 404 and second imaging component 406 is provided. The imaging components 404 and 406 may together provide a binocular imaging system. Each of the imaging components may be operably coupled to a movable object, such as a UAV. For example, the first and/or second imaging components may be embedded in the movable object. Alternatively or in addition, the first and/or second imaging component may be coupled to the movable object via a mechanism. In some instances, the mechanism may permit movement of the imaging component relative to the movable object. The movement may comprise translational movement and/or rotational movement. In some instances, the mechanism may comprise a gimbal. The gimbal may be configured to permit movement of the imaging component about one, two, or three axes.

Each of the imaging components may comprise an optical axis. For example, the first imaging component may comprise an optical axis 405 and the second imaging component may comprise an optical axis 407. In some instances, the optical axes of the imaging components 404 and 406 may be substantially parallel as shown in configuration 402. Alternatively, the imaging components may be arranged in any other fashion, e.g. at different angles. For example, the optical axes of the imaging components may not be substantially parallel as shown in configuration 408. The imaging components may be arranged horizontally, vertically, or at alternative configurations. Each of the imaging components may be located on a single imaging device. Alternatively, the imaging components may be located on different imaging devices.

Each of the imaging components may comprise a field of view (FOV). Each imaging component of the imaging system may have a different FOV. Alternatively, each imaging component of the imaging system may have identical (e.g., same) fields of views. In some instances, the fields of views of the imaging components may overlap or partially-overlap as shown in configuration 402. The fields of views of the imaging components may comprise both overlapping portions 410 and non-overlapping portions 412, 414. The first imaging component may capture a first set of images, e.g. of the FOV of the first imaging component. The second imaging component may capture a second set of images, e.g. of the FOV of the second imaging component. In some instances, the first and second set of images may be captured substantially simultaneously. The first and second set of images may comprise an overlapping portion and non-overlapping portions.

One or more processors operably coupled with the imaging components may be configured to obtain environmental information. In some instances, the one or more processors may be configured to obtain environmental information by processing data contained in an overlapping portion of the first and second set of images. For example, the one or more processors may obtain environmental information such as depth information by processing a disparity between images obtained by the first imaging component 404 and images obtained by the second imaging component 406. In some instances, the one or more processors may additionally be configured to obtain texture information. The texture information may provide information regarding a spatial arrangement of color or intensities in an image. The texture information may be obtained from both overlapping and/or non-overlapping portions of the images obtained by the first imaging component and the second imaging component. In some instances, the texture information may be utilized as a basis for obtaining environmental information for the movable object. Accordingly, the texture information obtained from a non-overlapping portion of the images may provide useful information for the movable object. For example, the texture information obtained from the non-overlapping portion may indicate object or obstacles of interest for the movable object. In some instances, the texture information may provide a basis for affecting a behavior of the movable object.

Figure 5:
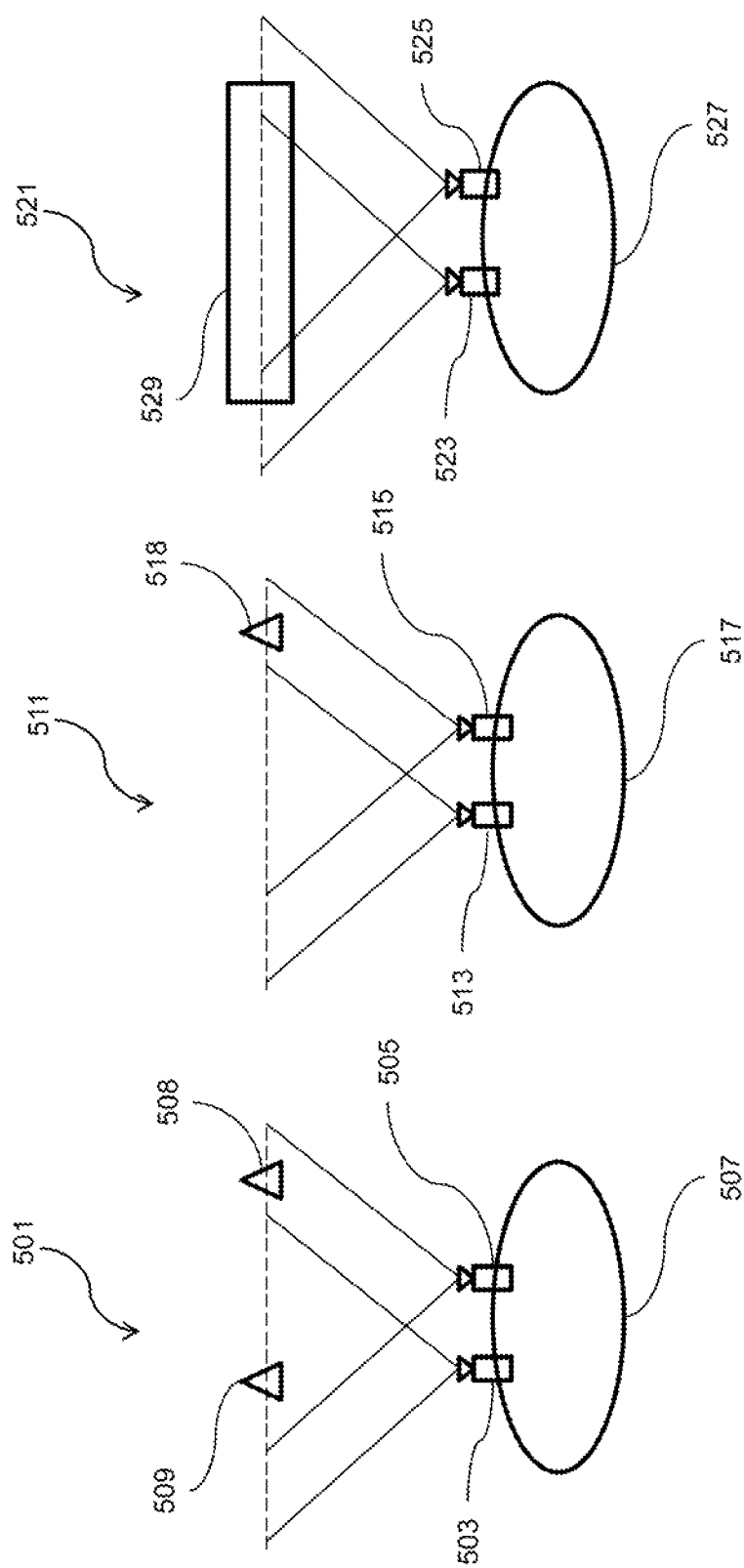
FIG. 5 illustrates exemplary configurations where texture information provides useful information for a movable object, in accordance with embodiments.

FIG. 5 illustrates exemplary configurations where texture information provides useful information for a movable object, in accordance with embodiments. In configuration 501, imaging components 503 and 505 are operably coupled to a UAV 507. The imaging components each capture a set of images with overlapping portions and non-overlapping portions. The overlapping portion comprises an object 509 while the non-overlapping portion comprises an object 508. One or more processors operably coupled to the imaging components may process an overlapping portion of the images to obtain environmental information for the UAV. For example, the one or more processors may determine a distance to object 509. This may be possible when the overlapping portion of the images are of sufficient quality.

In some instances, the quality of the portions (e.g. overlapping or non-overlapping portions of the images) may depend on an existence of features within the portions. In some instances, the quality of the portions may depend on a prominence of the features. The features may be identifiable or recognizable features. In some instances, the features may be features identifiable or recognizable by computer algorithms (e.g. programs). In some instances, the features may be features recognizable for computer vision applications. In some instances, the quality of the portions may be determined by analyzing a saliency or gradient of the portions. In some instances, the quality of portions of the images may be determined by analyzing a feature point number or optical flow within the portions.

In some instances, the quality of portions of the images may be determined by comparison to a predetermined criteria. The predetermined criteria may comprise a predetermined threshold, e.g. a threshold number or value. In some instances, a saliency, gradient, feature point number, and/or optical flow within an overlapping portion of the images may be compared to the predetermined criteria to determine whether the overlapping portion is of sufficient quality. In some instances, the overlapping portion may be of sufficient quality. For example, there may be sufficient information or data (e.g. identifiable features, saliency, etc) present in the overlapping portion to obtain environmental information for the UAV.

The one or more processors may be configured to process a non-overlapping portion of the images to obtain texture information. In some instances, the texture information may be obtained from the non-overlapping portions while environmental information is obtained from the overlapping portion. The texture information may be utilized as a basis for providing environmental information for the UAV. In some instances, by processing and taking into account information contained in both overlapping portions and non-overlapping portions of the images captured by the first and second imaging components, the UAV may be able to obtain more accurate or precise environmental information. In some instances, by processing and taking into account information contained in both overlapping portions and non-overlapping portions of the images captured by the first and second imaging components, the UAV may be able to obtain a greater amount of environmental information. For example, information regarding an obstacle or object 508 may be obtained based on the texture information obtained by processing a non-overlapping portion of the images. The environmental information may further be utilized in operation of the UAV, or in affecting a behavior of the UAV as previously described herein.

Optionally, the one or more processors may be configured to obtain texture information and/or environmental information from the non-overlapping portions of the images if the overlapping portion has an insufficient quality, or a quality below a predetermined criteria. In configuration 511, imaging components 513 and 515 are operably coupled to a UAV 517. The imaging components each capture a set of images with overlapping portions and non-overlapping portions. The overlapping portion comprises no objects while the non-overlapping portion comprises an object 518. One or more processors operably coupled to the imaging components may process an overlapping portion of the images to obtain environmental information for the UAV. However, the one or more processors may be unable to obtain environmental information from the overlapping portion. For example, there may be insufficient information (e.g. identifiable features, saliency, etc) within the overlapping portion such that environmental information may not be obtained. In some instances, the overlapping portion of the images may be of insufficient quality.

If the overlapping portion has an insufficient quality, the one or more processors may be configured to obtain texture information and/or environmental information from the non-overlapping portions of the images. In some instances, the obtained texture information may be utilized as a basis for providing environmental information for the UAV. By processing and taking into account information contained in a non-overlapping portion of the images captured by the first and second imaging components, the UAV may obtain more accurate or precise environmental information when it is unable to obtain environmental information from an overlapping portion of the images. In some instances, by processing and taking into account information contained in non-overlapping portions of the images captured by the first and second imaging components, the UAV may obtain environmental information when it is unable to obtain environmental information from an overlapping portion of the images. For example, information regarding an obstacle or object 518 may be obtained based on the texture information obtained by processing a non-overlapping portion of the images. The environmental information may further be utilized in operation of the UAV, or in affecting a behavior of the UAV as previously described herein.

In configuration 521, imaging components 523 and 525 are operably coupled to a UAV 527. The imaging components each capture a set of images with overlapping portions and non-overlapping portions. The overlapping portion comprises a portion of object 529 while the non-overlapping portion comprises another portion of the object. One or more processors operably coupled to the imaging components may process an overlapping portion of the images to obtain environmental information for the UAV. However, the one or more processors may be unable to obtain environmental information from the overlapping portion. In some instances, there may be insufficient information (e.g. identifiable features, saliency, etc) within the overlapping portion such that environmental information may not be obtained. For example, the object 529 may be a white wall having no distinguishing features. For example, the object 529 may be a wall having repetitious features. In some instances, the overlapping portion of the images may be of insufficient quality.

The one or more processors may additionally be configured to process a non-overlapping portion of the images to obtain texture information. The texture information may be utilized as a basis for providing environmental information for the UAV. In some instances, by processing and taking into account information contained in non-overlapping portions of the images captured by the first and second imaging components, the UAV may obtain more accurate or precise environmental information when it is unable to obtain environmental information from an overlapping portion of the images. In some instances, by processing and taking into account information contained in non-overlapping portions of the images captured by the first and second imaging components, the UAV may obtain a greater amount of environmental information when it is unable to obtain environmental information from an overlapping portion of the images. For example, information regarding the obstacle or object 529 may be obtained based on the texture information obtained by processing a non-overlapping portion of the images. The environmental information may further be utilized in operation of the UAV, or in affecting a behavior of the UAV as previously described herein.

In some instances, the one or more processors may be configured to generate a control signal if the overlapping portion of images captured by the first and second imaging components is of insufficient quality. The control signal may affect a behavior of the UAV. In some instances, the control signal may affect a state of the UAV, such as a position or orientation of the UAV. For example, if the overlapping portion of the images is below a predetermined quality, a control signal may be generated to stop a movement of the UAV and/or hover the UAV in a stationary position. As another example, if the overlapping portion of the images is below a predetermined quality, the one or more processors may generate a control signal to adjust an orientation of the UAV (e.g. with respect to the pitch, yaw, or roll axis of the UAV). In some instances, the adjustment may continue until a new overlapping portion of the images captured by the first and second imaging component has sufficient quality.

Alternatively or in addition, in response to texture information and/or environmental information obtained from a non-overlapping portion of the images, the one or more processors may be configured to generate a control signal. The control signal may affect a behavior of the UAV. In some instances, the control signal may affect a state of the UAV, such as a position or orientation of the UAV. For example, in response to the texture information and/or obstacle information obtained from the non-overlapping portion of the images, the one or more processors may generate a control signal to direct movement of the UAV as to avoid objects or obstacles identified from the non-overlapping portions. As another example, in response to the texture information and/or obstacle information obtained from the non-overlapping portion of the images, the one or more processors may generate a control signal to stop movement of the UAV and/or hover the UAV in a stationary position. As another example, in response to the texture information and/or obstacle information obtained from the non-overlapping portion of the images, the one or more processors may generate a control signal to adjust an orientation of the UAV (e.g. with respect to the pitch, yaw, or roll axis). In some instances, the adjustment may be such that a new overlapping portion of images captured by the first imaging component and the second imaging component has sufficient quality. For example, with respect to configuration 511, an orientation of the UAV may be adjusted such that an overlapping portion of images captured by the first imaging component and the second imaging component contains the object 518.

Figure 6:
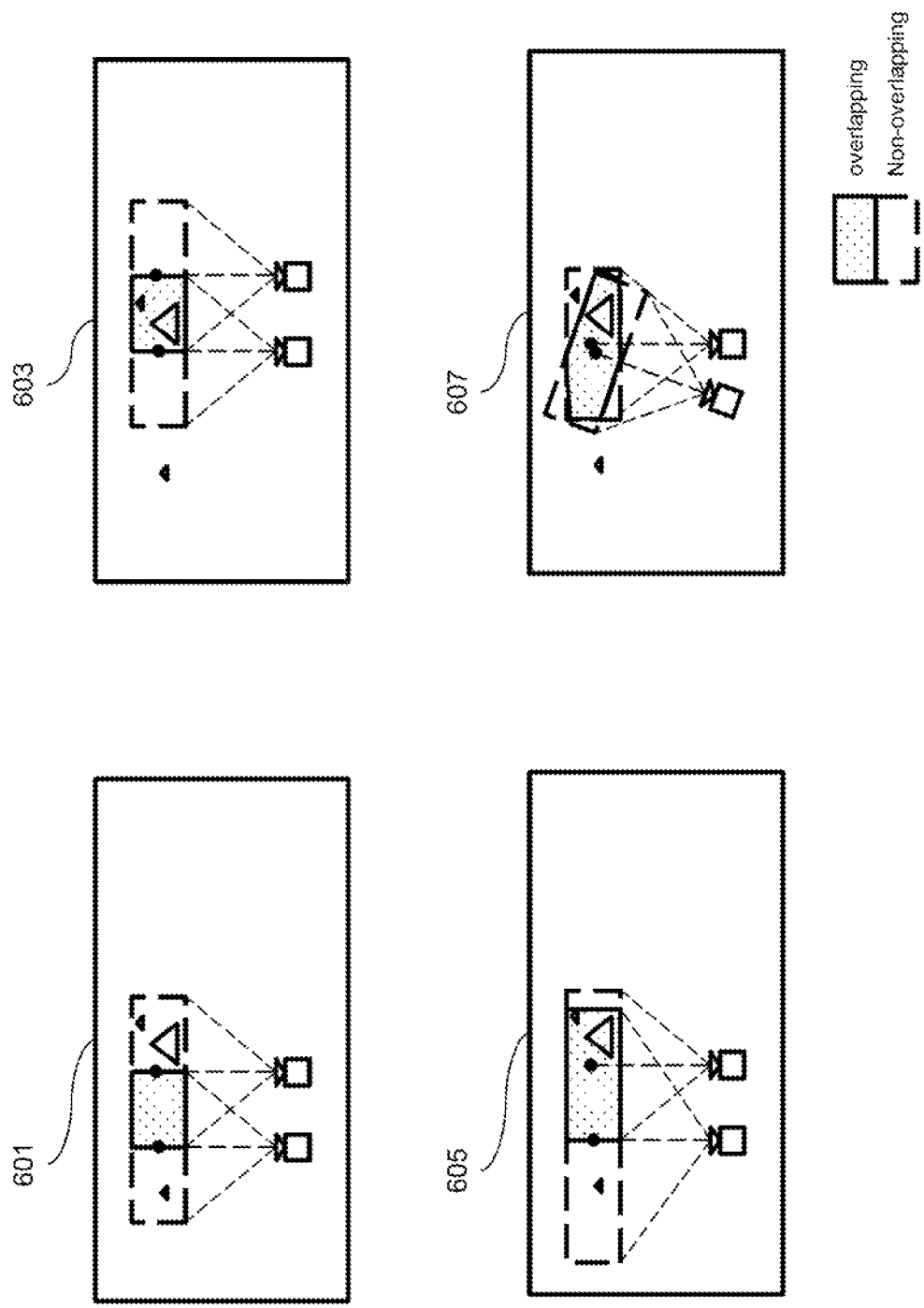
FIG. 6 illustrates exemplary adjustments in an imaging component in response to a control signal, in accordance with embodiments.

In some instances, the control signal may adjust the first and/or second imaging components. FIG. 6 illustrates exemplary adjustments in an imaging component in response to a control signal, in accordance with embodiments. For example, if the overlapping portion of the images is below a predetermined quality as shown in configuration 601, a control signal may be generated. Alternatively or in addition, based on the texture information and/or environmental information obtained from non-overlapping portions of the captured images, a control signal may be generated. In some instances, the control signal may affect a state of the first and/or second imaging components, such as a position or orientation of the imaging components. In some instances, the control signal may adjust an optical axis of the first and/or second imaging components. In some instances, the control signal may adjust a position of the first and/or second imaging components as shown in configuration 603. In some instances, the adjustment in the position of the imaging components may be relative to the UAV which the imaging components are coupled to. Alternatively or in addition, the adjustment in the position of the imaging components may occur as a result of a change in a position of the UAV. In some instances, the control signal may adjust an optical zoom of the first and/or second imaging components as shown in configuration 605. In some instances, the control signal may adjust an orientation of the first and/or second imaging components as shown in configuration 607. The adjustment in the orientation of the imaging components may be relative to the UAV which the imaging components are coupled to. Alternatively or in addition, the adjustment in orientation of the imaging components may occur as a result of a change in orientation of the UAV. In some instances, the adjustment may continue until a new overlapping portion of the images captured by the first and second imaging component has sufficient quality.

Figure 7:
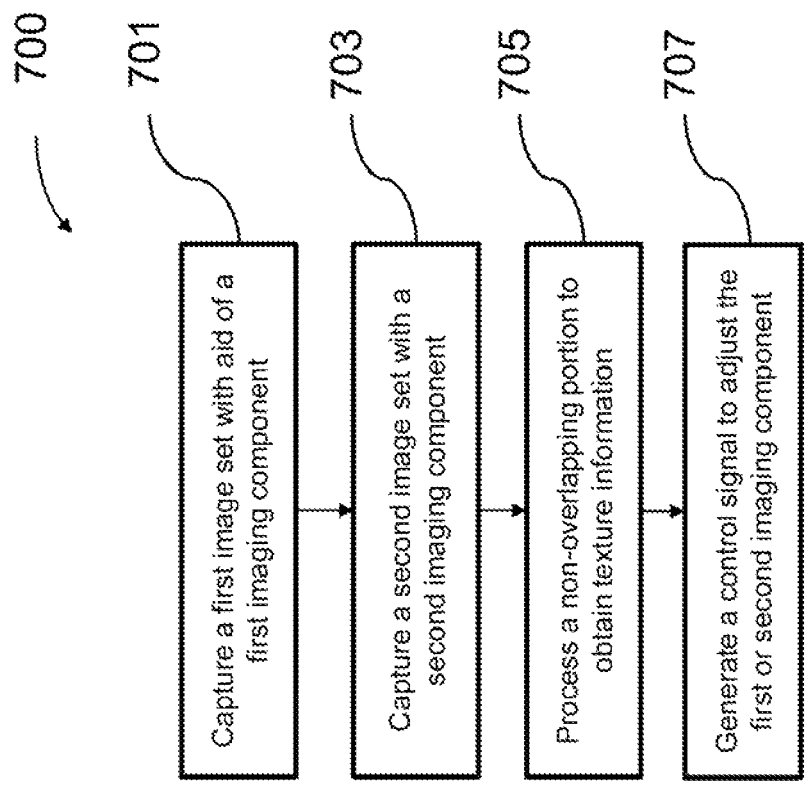
FIG. 7 illustrates a method of processing images captured by a movable object, in accordance with embodiments.

FIG. 7 illustrates a method 700 of processing images captured by a movable object, in accordance with embodiments. The movable object may be an unmanned aerial vehicle (UAV) as previously described herein. Alternatively, the movable object may be any other type of vehicle. The movable object may in some instances be operably coupled to a first imaging component and/or a second imaging component. For example, the first imaging component and/or the second imaging component may be located on-board the movable object. In some instances, the first imaging component and/or the second imaging component may be embedded, or be integrated with the movable object. The first and second imaging component may form a binocular imaging system.

In step 701, a first image set is captured with aid of a first imaging component. The first imaging component may be located within a first housing. In some instances, the first imaging component may be located on a first imaging device. The first imaging component may comprise a first lens system, e.g. lens, plurality of lenses, zoom lens, etc. In some instances, the first imaging component may comprise a monocular lens system. In addition, the first imaging component may comprise one or more sensors. The first imaging component may have a first field of view. In some instances, the first image set captured by the first imaging component may be an image set depicting the first field of view.

In step 703, a second image set is captured with aid of a second imaging component. In some instances, the second imaging component may be located within a second housing. The second housing may be the same as the first housing. Alternatively, the second housing may be different from the first housing. In some instances, the second imaging component may be located on a second imaging device. The second imaging device may be the same as the first imaging device. Alternatively, the second imaging device may be different from the first imaging device.

The second imaging component may comprise a second lens system, e.g. lens, plurality of lenses, zoom lens, etc. In some instances, the second imaging component may comprise a monocular lens system. In addition, the second imaging component may comprise one or more sensors. The second imaging component may have a second field of view. The second field of view may be similar in size (e.g. angle of view) to the first field of view. Alternatively, the second field of view may be different in size from the first field of view. In some instances, the second field of view may overlap with the first field of view. Accordingly, the first image set and the second image set may comprise overlapping portions and non-overlapping portions.

In some instances, an optical axis of the first imaging component and the second imaging component may be substantially parallel. Alternatively, the optical axis of the first and second imaging component may be at other angles and not be parallel. In some instances, an optical axis of the first imaging component and/or the second imaging component may be adjustable relative to one another. Accordingly, an optical axis of the first imaging component may be at an acute angle, parallel, and/or at an obtuse angle.

In some instances, one or more processors may be provided. The one or more processors may be located on-board the movable object. Alternatively or in addition, some, or all of the one or more processors may be located off-board the movable object. For example, parts of the processors may be located on a remote controller or mobile device operably coupled to the movable object. The one or more processors may individually or collective process a non-overlapping portion of the first image set and the second image set to obtain texture information in step 705. In some instances, the one or more processors may further be configured to analyze an overlapping portion of the first image set and the second image set to obtain environmental information for the movable object. Optionally, the one or more processors may obtain both texture information from the non-overlapping portions and environmental information from the overlapping portions of the first image set and the second image set simultaneously.

In some instances, if the overlapping portion of the first image set and the second image set has a quality below a predetermined threshold, the one or more processors may be configured to obtain environmental information for the movable object based on the texture information (e.g. obtained from the non-overlapping portion). As one example, based on texture information (e.g. color or intensities within an image), insight regarding an environment the UAV is operating in may be obtained. For example, based on the texture information, determination that there are objects or obstacles within the environment the UAV is operating may be obtained. In some instances, the quality of the overlapping portion may be analyzed using image processing techniques. As an example, the one or more processors may be configured to analyze a saliency or gradient of the overlapping portion of the images in order to determine the quality. As another example, the one or more processors may be configured to analyze a feature point number or an optical flow within the overlapping portion to determine the quality.

In some instances, the quality of the overlapping portion may be below the predetermined threshold if there are insufficient features present in the overlapping portion. In some instances, if the quality of the overlapping portion is below the predetermined threshold, depth information may not be obtained from that portion. As previously described herein, the environmental information may include any information useful for operation of the movable object. For example, the environmental information may comprise depth information, obstacle information, object information, and/or state information for the movable object. The state information for the movable object may include a position, orientation, velocity, or acceleration of the movable object. Optionally, the one or more processors may generate a control signal to adjust the first imaging component and/or the second imaging component in step 707. In some instances, the control signal may be generated if an overlapping portion of the first and second image sets have a quality below the predetermined threshold. Alternatively or in addition, the control signal may be generated based on the texture information obtained in step 705. In some instances, the control signal may be generated based on environmental information obtained from the texture information. For example, as substantially described above, the control signal may be generated based on existence of an object or an obstacle. In some instances, the control signal may be generated if there is an object or an obstacle determined to be present in an non-overlapping portion. The adjustment may be an adjustment in an optical axis of the first imaging component and/or the second imaging component. For example, the control signal may provide an instruction for adjustment of the movable object based on texture information and/or environmental information obtained from a non-overlapping portion of images. The adjustment for the movable object may be an adjustment in a state of the movable object. For example, the adjustment may be an adjustment in a position, orientation, velocity, and/or acceleration of the movably object. In some instances, the adjustment may be an adjustment of an orientation of the movable object with respect to its pitch, yaw, or roll axis. As a result of the adjustment of the movable object, the optical axes of the imaging components which are coupled to the movable object may accordingly be adjusted.

In some instances, the adjustment of the first and/or second imaging components may be configured to be such that a new overlapping portion of the first field of view and the second field of view encompasses at least a portion of the previously non-overlapping portion of the first image set and the second image set. In some instances, the adjustment of the first and/or second imaging components may be configured to be such that a new overlapping portion of the first field of view and the second field of view has a different size than a previous overlapping portion. For example, an optical axis of the first and second imaging components may move relative to one another such that a size of the overlapping portion changes, e.g. as shown in configuration 607 of FIG. 6. In some instances, the one or more processors may be configured to repeat the processing and generating steps during flight of the movable object. The processing and generating steps may be repeated at least every 60 seconds, 30 seconds, 10 seconds, 5 seconds, 4 seconds, 3 seconds, 2 seconds, 1 second, 0.5 seconds, 0.3 seconds, 0.1 second, 0.05 seconds, or 0.01 seconds.

In some instances, a system may be provided for implementing the method 700. The system may comprise one or more processors, individually or collectively configured to: process a non-overlapping portion of a first image set and a second image set to obtain texture information, wherein the first image set is captured by a first imaging component having a first field of view and the second image set is captured by a second imaging component having a second field of view overlapping with the first field of view; and generate a control signal to adjust the first imaging component and/or the second imaging component based on the texture information.

In some instances, an apparatus may be provided for implementing the method 700. The apparatus may comprise a first imaging component having a first field of view, wherein the first imaging component is configured to capture a first image set; a second imaging component having a second field of view overlapping with the first field of view, wherein the second imaging component is configured to capture a second image set; and one or more processors, individually or collectively configured to: process a non-overlapping portion of the first image set and the second image set to obtain texture information; and generate a control signal to adjust the first imaging component and/or the second imaging component based on the texture information.

In some instances, a non-transitory computer readable medium may be provided for implementing the method 700. The non-transitory computer readable medium may comprise code logic or instructions to: capture a first image set with a first imaging component, wherein the first imaging component has a first field of view; capture a second image set with a second imaging component, wherein the second imaging component has a second field of view overlapping with the first field of view; with aid of one or more processors, individually or collectively, process a non-overlapping portion of the first image set and the second image set to obtain texture information; and generate a control signal to adjust the first imaging component and/or the second imaging component based on the texture information.

Figure 8:
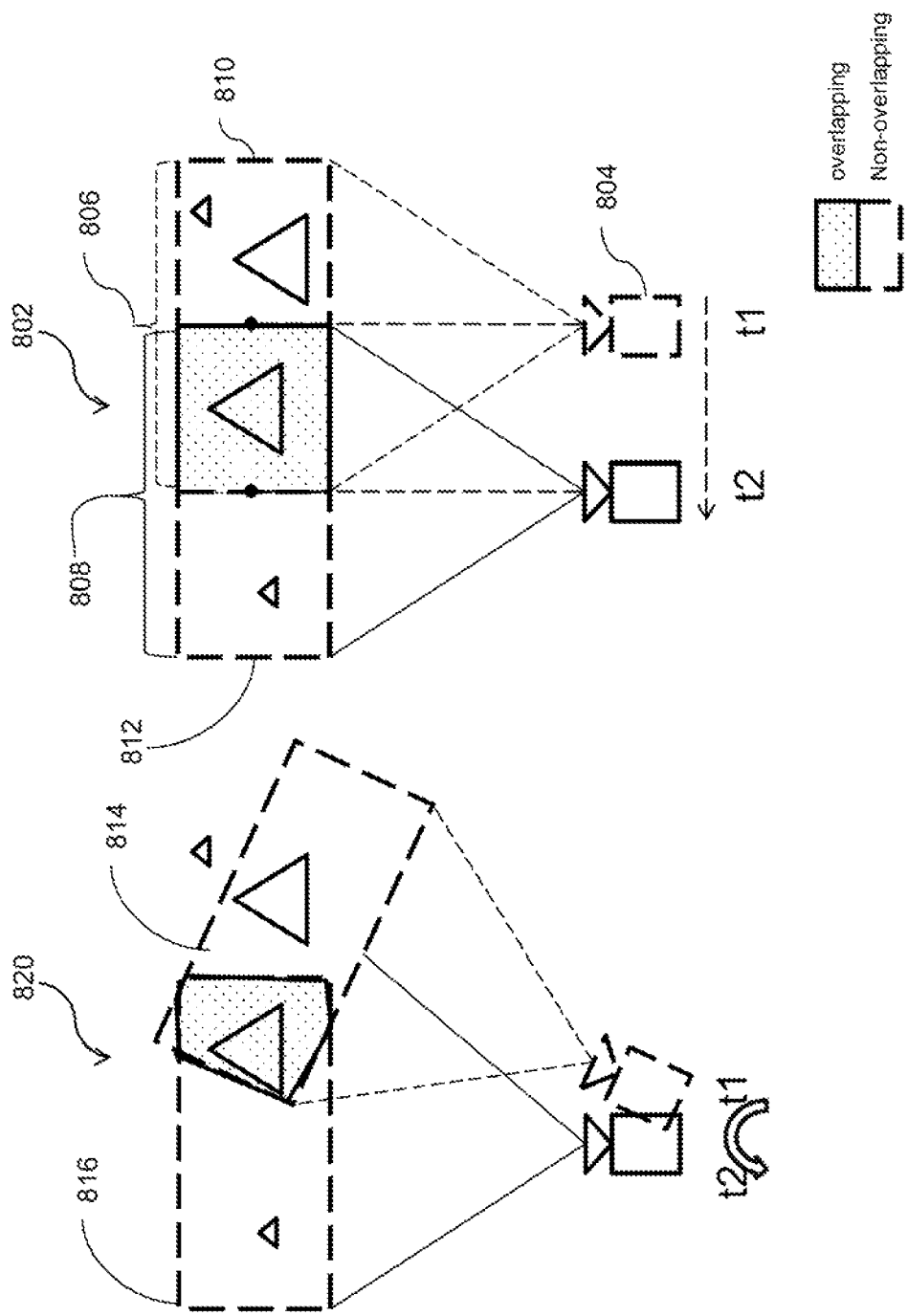
FIG. 8 illustrates movable imaging systems used to obtain environmental information, in accordance with embodiments.

FIG. 8 illustrates movable imaging systems used to obtain environmental information, in accordance with embodiments. In configuration 802, an imaging system with an imaging component 804 is provided. The imaging component may provide a monocular imaging system. In some instances, the imaging component may be a part of the binocular imaging system, substantially described above. Alternatively, the imaging component may comprise a binocular imaging system. The imaging component may be operably coupled to a movable object, such as a UAV. For example, the imaging component may be embedded in the movable object. Alternatively or in addition, the imaging component may be coupled to the movable object via a mechanism. In some instances, the mechanism may permit movement of the imaging component relative to the movable object. The movement may comprise translational movement and/or rotational movement. In some instances, the mechanism may comprise a gimbal. The gimbal may be configured to permit movement of the imaging component about one, two, or three axes.

The imaging component may be adjusted over time. In some instances, the adjustment may produce a change in a field of view of the imaging component. For example, in configuration 802, the field of view of the imaging component varies from FOV 806 to FOV 808. In some instances, the change in the field of view may be due to an adjustment in an optical axis and/or position of the imaging component. For example, the optical axis of the imaging component may undergo translational movement as shown in configuration 802. As another example, the optical axis of the imaging component may undergo rotational movement as shown in configuration 820. In some instances, the adjustment in the optical axis of the imaging component may occur as a movable object which the imaging component is coupled to undergoes an adjustment. For example, as the movable object undergoes a change in position and/or orientation, the imaging component may undergo a corresponding change in position and/or orientation. Alternatively or in addition, the adjustment in the optical axis of the imaging component may occur independently of an adjustment in the movable object. For example, a mechanism may be configured to move the imaging component relative to the movable object which it is coupled to. The movement of the imaging component relative to the movable object may be a translational movement and/or rotational movement. In some instances, the mechanism may be a gimbal that is capable of moving the imaging component relative to 1, 2, or 3 axes. Alternatively or in addition, the change in the field of view may be due to an adjustment in a configuration of the imaging component. For example, a zoom level of the imaging component may be adjusted, e.g. by relative movement of lens of an optical zooming system.

In some instances, the imaging component may be configured to scan an area. The area may be greater than a size of the field of view of the imaging component. Scanning of the area may allow the imaging component and/or one or more processors to obtain a greater amount of texture information and/or environmental information during operation. In some instances, the imaging component may be configured to periodically scan an area. Periodically scanning an area may implemented through a predetermined movement of the imaging component. In some instances, the predetermined movement of the imaging component may happen as a result of a predetermined movement of the movable object that is coupled to the imaging component. For example, while the movable object is hovering, it may scan an area by adjusting its orientation about its roll, pitch, or yaw axis. For example, while the movable object is in motion, it may scan an area by adjusting its orientation about its roll, pitch, or yaw axis. Alternatively or in addition, the predetermined movement of the imaging component may be relative to the movable object. For example, a mechanism may allow a predetermined movement of the imaging component relative to the movable object. The mechanism may be a translational or rotational mechanism that allows translational movement of the imaging component about the movable object. The mechanism may be a rotational mechanism that allows rotational movement of the imaging component about the movable object. In some instances, the mechanism may be a gimbal that permits movement of the imaging component about one, two, or three axes.

In some instances, the predetermined movement may be a translational movement of the imaging component as shown in configuration 802. Alternative or in addition, the predetermined movement may be a rotational movement of the imaging component as shown in configuration 820. In some instances, the predetermined movement may comprise a translational and rotational movement of the imaging component. In some instances, the imaging component may be configured to scan the area equal to or less than about every 30 seconds, 20 seconds, 10 seconds, 5 seconds, 3 seconds, 2 seconds, 1 second, or 0.5 seconds. In some instances, an optical axis of the imaging component may vary by about 2°, 5°, 10°, 15°, 20°, 30°, 45°, 60°, 75°, 90°, or more during the periodic scanning. In some instances, an optical axis of the imaging component may vary by about 0.5 cm, 1 cm, 2 cm, 3 cm, 5 cm, 10 cm, 20 cm, or more during the periodic scanning.

The imaging component may capture a sequence of images e.g. images of the FOV of the imaging component over time. In some instances, the sequence of images may be captured during the scanning of an area by the imaging component. The sequence of images may comprise two or more images. In some instances, the sequence of images may be captured with differing orientations and/or positions of the optical axis as described above. For example, the imaging component may capture a first image 810 at an initial time (t1). Subsequently, after changing its position, the imaging component may capture a second image 812 at a subsequent time (t2). As another example, the imaging component may capture a first image 814 at an initial time (t1). Subsequently, after changing its orientation, the imaging component may capture a second image 816 at a subsequent time (t2) as shown in configuration 820. The sequence of images may overlap or partially-overlap as shown in configurations 802 and 820. In some instances, the sequence of images may comprise an overlapping portion and non-overlapping portions.

One or more processors operably coupled with the imaging component may be configured to obtain environmental information. In some instances, the one or more processors may be configured to obtain environmental information by processing data contained in an overlapping portion of the sequence of images. For example, the one or more processors may obtain environmental information such as depth information by processing a disparity between images obtained in sequence, e.g. image obtained at t1 and image obtained at t2. In some instances, the one or more processors may be configured to obtain texture information. The texture information may provide information regarding a spatial arrangement of color or intensities in an image. The texture information may be obtained from both overlapping and/or non-overlapping portions of the sequence of images obtained by imaging component. In some instances, the texture information may be utilized as a basis for obtaining environmental information for the movable object. Accordingly, the texture information obtained from a non-overlapping portion of the sequence of images may provide useful information for the movable object. For example, the texture information in the non-overlapping portion may indicate object or obstacles of interest for the movable object. In some instances, the texture information may provide a basis for affecting a behavior of the movable object.

Figure 9:
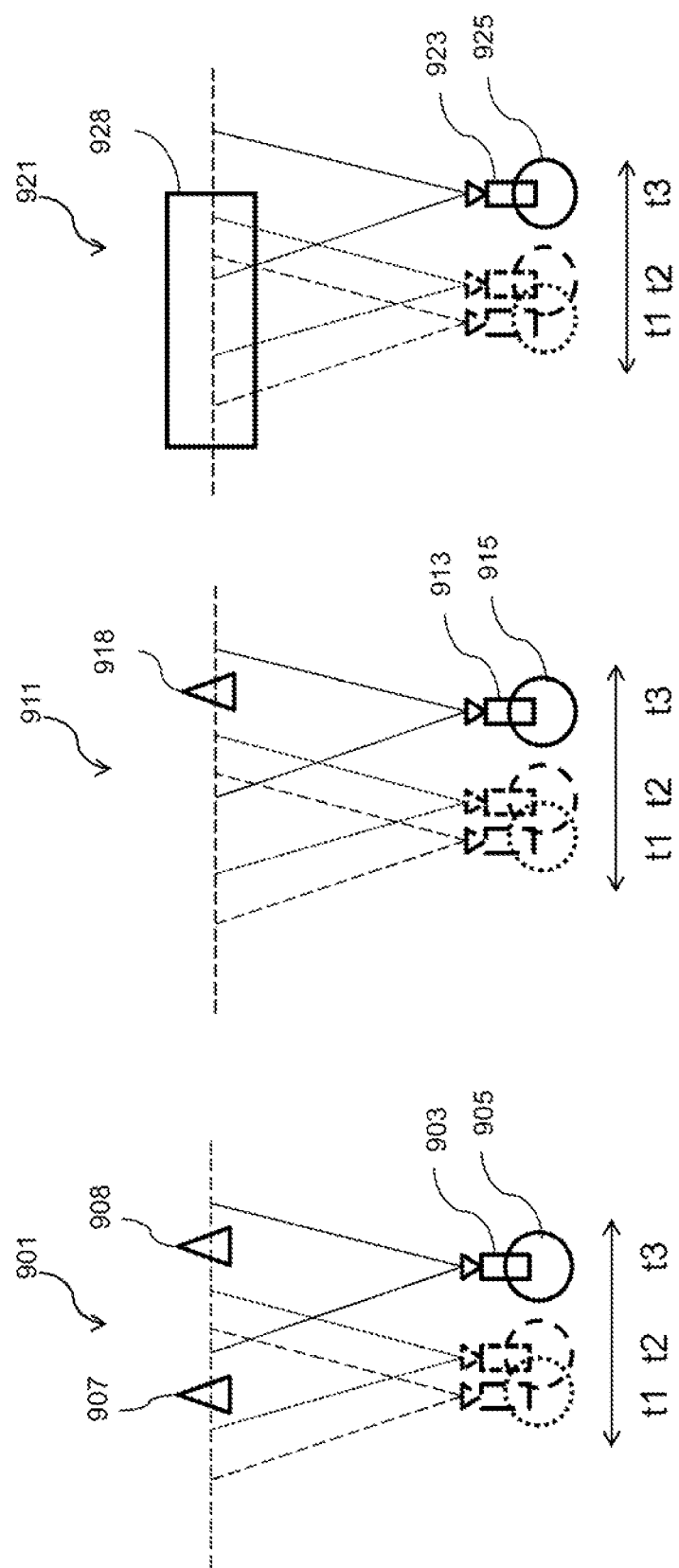
FIG. 9 illustrates exemplary configurations where texture information is obtained for a movable object, in accordance with embodiments.

FIG. 9 illustrates exemplary configurations where texture information is obtained for a movable object, in accordance with embodiments. In configuration 901, imaging component 903 is operably coupled to a UAV 905. The imaging component may capture a sequence of images with differing fields of views. In some instances, the sequence of images may comprise overlapping portions and non-overlapping portions. For example, the imaging component 903 may capture a sequence of three images at a first time (t1), a second time (t2), and a third time (t3) with differing fields of view. The overlapping portion comprises an object 907 while the non-overlapping portion comprises an object 908. One or more processors operably coupled to the imaging component may process an overlapping portion of the sequence of images to obtain environmental information for the UAV. For example, the one or more processors may determine a distance to object 907 by processing data contained in an overlapping portion of the sequence of images. This may be possible when the overlapping portion of the sequence of images are of sufficient quality.

In some instances, the quality of the portions (e.g. overlapping or non-overlapping portions of the images) may depend on an existence of features in the portions. In some instances, the quality of the portions may depend on a prominence of the features in the portions. The features may be identifiable or recognizable features. In some instances, the features may be features identifiable or recognizable by computer algorithms (e.g. programs). In some instances, the features may be features recognizable for computer vision applications. In some instances, the quality of the portions may be determined by analyzing a saliency or gradient of the portions. In some instances, the quality of portions of the images may be determined by analyzing a feature point number or information regarding an optical flow within the portions. For example, the quality of portions of the images may be of sufficient quality if a number of feature points within the portions are equal to or greater than about 1, 2, 5, 10, 20, 30, 40, 50, 60, 70, 80, 90, 100, 120, 140, 160, 180, 200, 250, or 300.

In some instances, the quality of portions of the sequence of images may be determined by comparison to a predetermined criteria. The predetermined criteria may comprise a predetermined threshold, e.g. a threshold number or value. In some instances, a saliency, gradient, feature point number, and/or optical flow within an overlapping portion of the images may be compared to the predetermined criteria to determine whether the overlapping portion is of sufficient quality. In some instances, the overlapping portion may be of sufficient quality. For example, there may be sufficient information or data (e.g. identifiable features, saliency, etc) present in the overlapping portion to obtain environmental information for the UAV.

The one or more processors may additionally be configured to process a non-overlapping portion of the images to obtain texture information. In some instances, the texture information may be obtained from the non-overlapping portions while environmental information is obtained from the overlapping portion. The texture information may be utilized as a basis for providing environmental information for the UAV. In some instances, by processing and taking into account information contained in both overlapping portions and non-overlapping portions of the sequence of images captured by the imaging component, the UAV may be able obtain more accurate or precise environmental information. In some instances, by processing and taking into account information contained in both overlapping portions and non-overlapping portions of the sequence images captured by the imaging component, the UAV may be able to obtain a greater amount of environmental information. For example, information regarding an obstacle or object 908 may be obtained based on the texture information obtained by processing a non-overlapping portion of the images. The environmental information may further be utilized in operation of the UAV, or in affecting a behavior of the UAV as previously described herein.

Optionally, the one or more processors may be configured to obtain texture information and/or environmental information from the non-overlapping portions of the sequence of images if the overlapping portion has an insufficient quality, or a quality below a predetermined criteria. In configuration 911, imaging component 913 is operably coupled to a UAV 915. The imaging component captures a sequence of images with overlapping portions and non-overlapping portions. The overlapping portion comprises no objects while the non-overlapping portion comprises an object 918. One or more processors operably coupled to the imaging component may process an overlapping portion of the images to obtain environmental information for the UAV. However, the one or more processors may be unable to obtain environmental information from the overlapping portion. For example, there may be insufficient information (e.g. identifiable features, saliency, etc) within the overlapping portion such that environmental information may not be obtained. The overlapping portion of the sequence of images may be of insufficient quality.

If the overlapping portion has an insufficient quality, the one or more processors may be configured to obtain texture information and/or environmental information from the non-overlapping portions of the images. In some instances, the obtained texture information may be utilized as a basis for providing environmental information for the UAV. In some instances, by processing and taking into account information contained in a non-overlapping portion of the sequence of images captured by the imaging component, the UAV may be able to obtain more accurate or precise environmental information when it is unable to obtain environmental information from an overlapping portion of the images. In some instances, by processing and taking into account information contained in non-overlapping portions of the sequence of images captured by the imaging component, the UAV may obtain environmental information when it is unable to obtain environmental information from an overlapping portion of the images. For example, information regarding an obstacle or object 918 may be obtained based on the texture information obtained by processing a non-overlapping portion of the images. The environmental information may further be utilized in operation of the UAV, or in affecting a behavior of the UAV as previously described herein.

In configuration 921, imaging component 923 is operably coupled to a UAV 925. The imaging component captures a sequence of images with overlapping portions and non-overlapping portions. The overlapping portion comprises a portion of object 928 while the non-overlapping portion comprises another portion of the object. One or more processors operably coupled to the imaging component may process an overlapping portion of the images to obtain environmental information for the UAV. However, the one or more processors may be unable to obtain environmental information from the overlapping portion. In some instances, there may be insufficient information (e.g. identifiable features, saliency, etc) within the overlapping portion such that environmental information may not be obtained. For example, the object 928 may be a white wall having no distinguishing features. For example, the object 928 may be a wall having repetitious features. In some instances, the overlapping portion of the images may be of insufficient quality.

The one or more processors may additionally be configured to process a non-overlapping portion of the images to obtain texture information. The texture information may be utilized as a basis for providing environmental information for the UAV. In some instances, by processing and taking into account information contained in non-overlapping portions of the sequence of images captured by the imaging component, the UAV may be able to obtain more accurate or precise environmental information when it is unable to obtain environmental information from an overlapping portion of the images. In some instances, by processing and taking into account information contained in non-overlapping portions of the sequence of images captured by the imaging component, the UAV may be able to obtain a greater amount of environmental information when it is unable to obtain environmental information from an overlapping portion of the images. For example, information regarding the obstacle or object 928 may be obtained based on the texture information obtained by processing a non-overlapping portion of the images. The environmental information may further be utilized in operation of the UAV, or in affecting a behavior of the UAV as previously described herein.

In some instances, the one or more processors may be configured to generate a control signal if the overlapping portion of the sequence of images captured by the imaging component is of insufficient quality. The control signal may affect a behavior of the UAV. In some instances, the control signal may affect a state of the UAV, such as a position or orientation of the UAV. For example, if the overlapping portion of the images is below a predetermined quality, a control signal may be generated to stop a movement of the UAV and/or hover the UAV in a stationary position. As another example, if the overlapping portion of the images is below a predetermined quality, the one or more processors may generate a control signal to adjust an orientation of the UAV (e.g. with respect to the pitch, yaw, or roll axis of the UAV). In some instances, the adjustment may continue until a new overlapping portion of the sequence of images captured by the imaging component has sufficient quality. In some instances, if the overlapping portion of the images is below a predetermined quality, the one or more processors may generate a control signal to scan an area, substantially as described above.

Alternatively or in addition, in response to texture information and/or environmental information obtained from a non-overlapping portion of the sequence of images, the one or more processors may be configured to generate a control signal. The control signal may affect a behavior of the UAV. In some instances, the control signal may affect a state of the UAV, such as a position or orientation of the UAV. For example, in response to the texture information and/or obstacle information obtained from the non-overlapping portion of the images, the one or more processors may generate a control signal to direct movement of the UAV as to avoid objects or obstacles identified from the non-overlapping portions. As another example, in response to the texture information and/or obstacle information obtained from the non-overlapping portion of the images, the one or more processors may generate a control signal to stop movement of the UAV and/or hover the UAV in a stationary position. As another example, in response to the texture information and/or obstacle information obtained from the non-overlapping portion of the images, the one or more processors may generate a control signal to adjust an orientation of the UAV (e.g. with respect to the pitch, yaw, or roll axis). In some instances, the adjustment may be such that a new overlapping portion of the sequence of images captured by the imaging component has sufficient quality or quality above a predetermined threshold. For example, with respect to configuration 911, the adjustment may be such that subsequent to adjustment of the orientation of the UAV, the imaging component scans an area containing the object 918 such that an overlapping portion of the sequence of images captured by the imaging component contains the object.

Figure 10:
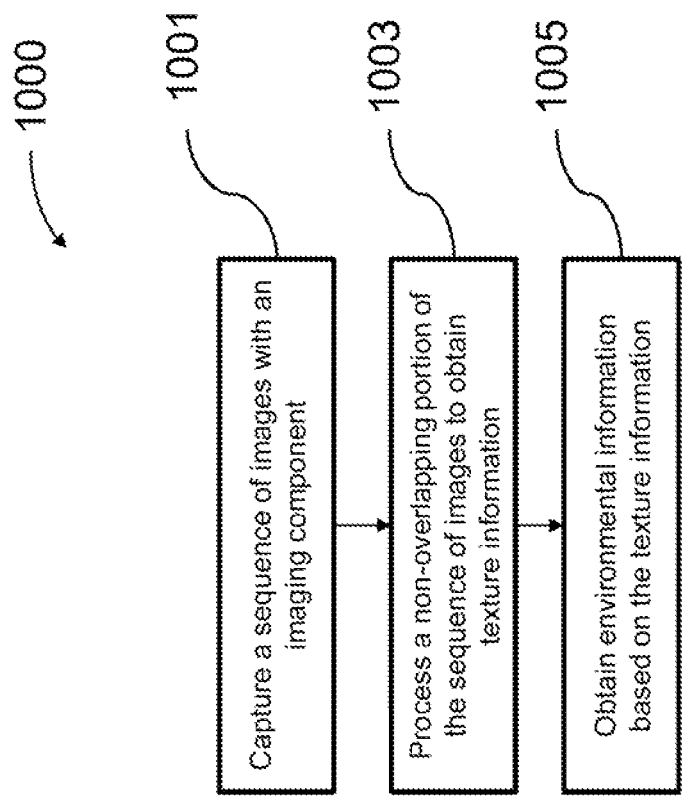
FIG. 10 illustrates a method for processing images captured by a movable object, in accordance with embodiments.

FIG. 10 illustrates a method 1000 for processing images captured by a movable object, in accordance with embodiments. The movable object may be an unmanned aerial vehicle (UAV) as previously described herein. Alternatively, the movable object may be any other type of vehicle. The movable object may in some instances be operably coupled to an imaging component. For example, the imaging component may be located on-board the movable object. In some instances, the imaging component may be embedded, or be integrated with the movable object. The imaging component may form a monocular imaging system.

In step 1001, a sequence of images is captured with an imaging component. The imaging component may be located within a housing. In some instances, the imaging component may be located on an imaging device. The imaging component may comprise a lens system, e.g. lens, plurality of lenses, zoom lens, etc. In some instances, the imaging component may comprise a monocular lens system. In addition, the imaging component may comprise one or more sensors. The imaging component may have a field of view. The sequence of images may comprise two or more images. In some instances, the sequence of images may comprise differing fields of view. In some instances, the sequence of images may comprise two or more images with an overlapping portion and non-overlapping portions.

In some instances, the sequence of images may be captured as the movable object is in motion, e.g. forward motion, backward motion, etc. Alternatively or in addition, the sequence of images may be captured while the movable object is substantially stationary. For example, the movable object may be hovering but may be rotating about its pitch, yaw, or roll axis. In some instances, the sequence of images may be captured by sequentially adjusting an optical axis of the imaging component relative to the movable object.

In some instances, a mechanism may be provided to adjust an optical axis of the imaging component. In some instances, the mechanism may enable the imaging component to scan an area greater than its field of view. Optionally, the imaging component may be configured to scan the area about every 60 seconds, 30 seconds, 10 seconds, 5 seconds, 4 seconds, 3 seconds, 2 seconds, 1 second, 0.5 seconds, 0.3 seconds, 0.1 second, 0.05 seconds, or 0.01 second with aid of the mechanism. In some instances, the optical axis of the imaging component may vary by about 2°, 5°, 10°, 15°, 20°, 30°, 45°, 60°, 75°, 90°, or more during the scan.

The mechanism may move the optical axis of the imaging component in concert with movement of the movable object. For example, the mechanism may be propulsion mechanisms on board the movable object that enables movement of the movable object. In some instances, the mechanism may move the optical axis of the imaging component relative to the movable object. For example, the mechanism may be a translational or rotational mechanism that allows movement of the imaging component relative to the movable object. For example, the mechanism may be a gimbal that allows rotation of the imaging component about one, two, or three axes. In some instances, the mechanism may allow movement of the imaging component about a yaw axis of the movable object. In some instances, the mechanism may allow movement of the imaging component about a roll axis of the movable object. In some instances, the mechanism may allow movement of the imaging component about a pitch axis of the movable object. In some instances, the mechanism may allow movement of the imaging component about an outer surface of the movable object.

In some instances, one or more processors may be provided. The one or more processors may be located on-board the movable object. Alternatively or in addition, some, or all of the one or more processors may be located off-board the movable object. For example, parts of the processors may be located on a remote controller or mobile device operably coupled to the movable object. The one or more processors may individually or collective process a non-overlapping portion of the sequence of images to obtain texture information in step 1003.

In step 1005, the one or more processors may obtain environmental information for the movable object based on the texture information. The environmental information may be substantially as described herein, e.g. useful information for operation of the movable object. In some instances, the environmental information comprises depth information. In some instances, the environmental information comprises obstacle information or state information of the movable object.

Optionally, the one or more processors may further be configured to generate a control signal to control a position and/or orientation of the movable object based on the obtained environmental information. Alternatively or in addition, the one or more processors may further be configured to generate a control signal to control a position and/or orientation of an imaging device coupled to the movable object relative to the movable object based on the obtained environmental information. In some instances, the one or more processors may be configured to repeat the processing and generating steps during flight of the movable object. The processing and obtaining steps may be repeated at least every 60 seconds, 30 seconds, 10 seconds, 5 seconds, 4 seconds, 3 seconds, 2 seconds, 1 second, 0.5 seconds, 0.3 seconds, 0.1 second, 0.05 seconds, or 0.01 seconds.

In some instances, a system may be provided for implementing the method 1000. The system may comprise one or more processors, individually or collectively configured to: process a non-overlapping portion of a sequence of images to obtain texture information, wherein the sequence of images are captured by an imaging component and comprise overlapping portions; and obtain environmental information for the movable object based on the texture information.

In some instances, an apparatus may be provided for implementing the method 1000. The apparatus may comprise an imaging component configured to capture a sequence of images, wherein the sequence of images comprise overlapping portions; and one or more processors, individually or collectively configured to: process a non-overlapping portion of the sequence of images to obtain texture information; and obtain environmental information for the movable object based on the texture information.

In some instances, a non-transitory computer readable medium may be provided for implementing the method 1000. The non-transitory computer readable medium may comprise code, logic, or instructions to: capture a sequence of images with an imaging component, wherein the sequence of images comprise overlapping portions; with aid of one or more processors, individually or collectively, process a non-overlapping portion of the sequence of images to obtain texture information; and obtain environmental information for the movable object based on the texture information.

The methods and systems described above may be utilized individually or collectively with one another. In some instances, the binocular imaging system may be utilized in conjunction with a monocular imaging system. In some instances, the monocular imaging system may supplement the binocular imaging system. For example, a binocular imaging system may comprise a first imaging component and a second imaging component. An overlapping portion of the images captured by the two imaging components may be processed to determine environmental information for a UAV. Additionally, each of the first imaging component and the second imaging component may provide a monocular imaging system. An overlapping portion of a sequence of images captured by the first imaging component and/or the second imaging component may be processed to determine environmental information for the UAV. This may occur as an alternative to the binocular imaging system obtaining environmental information, e.g. when data quality if insufficient or below a predetermined threshold. Accordingly, imaging components may selectively be utilized in a binocular imaging system and a monocular imaging system to effectively obtain environmental information. For example, a binocular imaging system with a narrow field of view may be utilized to obtain environmental information while a monocular imaging system with a wide field of view which may have greater distortion may selectively be utilized to obtain environmental information when beneficial or necessary.

Figure 11:
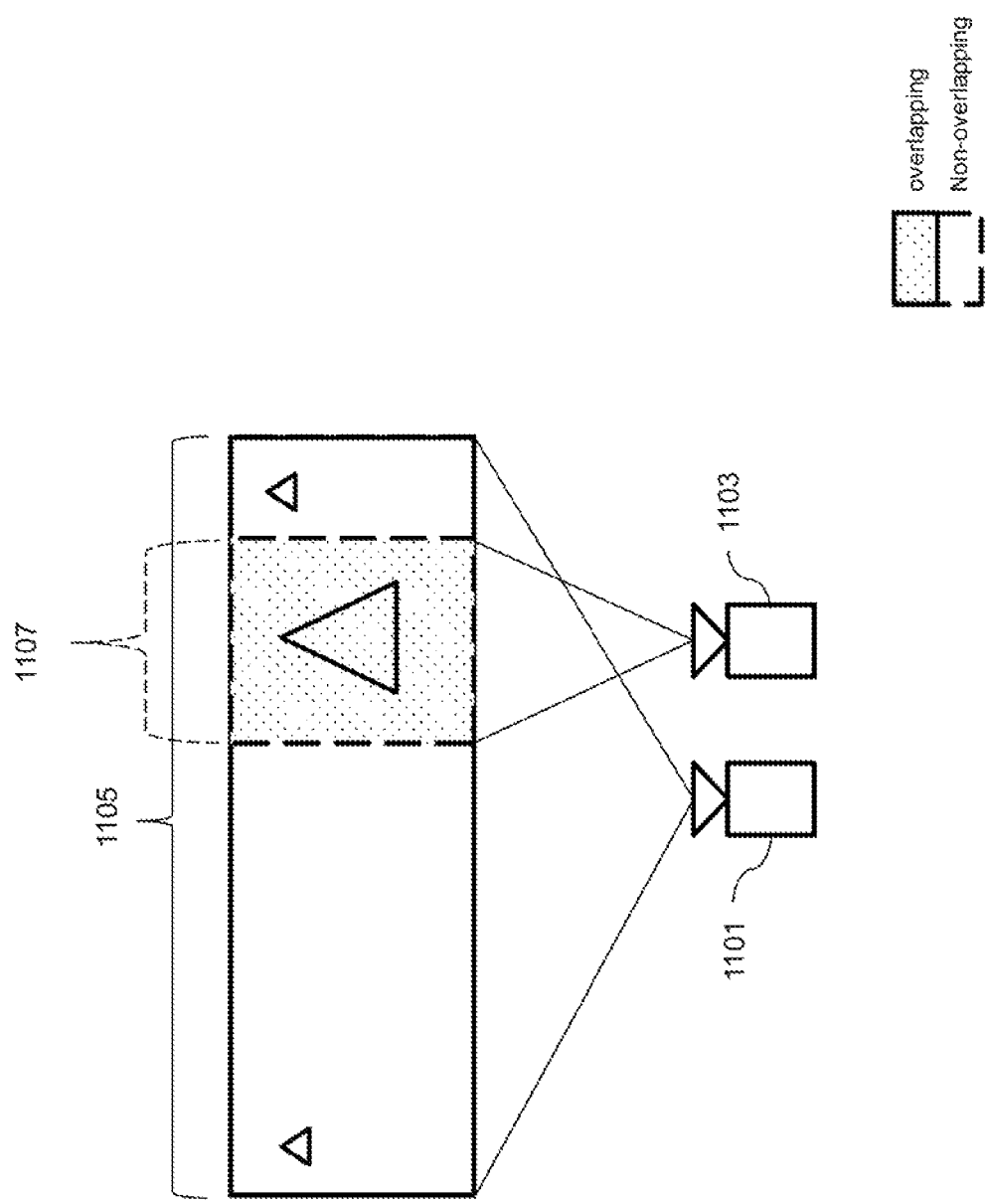
FIG. 11 illustrates an imaging system selectively obtaining environmental information, in accordance with embodiments.

FIG. 11 illustrates an imaging system selectively obtaining environmental information, in accordance with embodiments. While an imaging system comprising imaging components having differing fields of views is described in FIG. 11, it is not meant to be limiting. For example, the selective utilization of binocular imaging system or monocular imaging system may be applicable to any imaging system with two or more imaging components. The imaging system may comprise a first imaging component 1101. The first imaging component may have a first field of view. In some instances, the first field of view may be less than or equal to about 180°, 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, or 30°. The imaging system may comprise a second imaging component 1103. The second imaging component may have a second field of view. In some instances, the second field of view may be less than or equal to about 180°, 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, or 30°. The second field of view may be less than the first field of view. The second field of view may be narrower than the first field of view in some instances.

In some instances, the second field of view may be encompassed by the first field of view, e.g. as shown in FIG. 11. In other instances, the second field of view may partially overlap with the first field of view. Optionally, the second field of view may not overlap with the first field of view. In some instances, the first and second imaging component may be adjusted relative to one another. For example, the first and second imaging components may be translatable and/or rotatable relative to one another. In some instances, imaging components 1101 and 1103 may each provide, or may be used as part of, a monocular imaging system. Alternatively, imaging components 1101 and 1103 may each provide, or may be used as part of, a binocular imaging system. As an example, imaging component 1103 may comprise a binocular imaging system and capture an overlapping set of images (e.g. substantially simultaneously). In some instances, imaging components 1101 and 1103 may together provide, or may be used as part of, a binocular imaging system.

Each of the imaging components may be operably coupled to a movable object, such as a UAV. For example, the imaging components may be embedded in the movable object. Alternatively or in addition, the imaging component may be coupled to the movable object via a mechanism, substantially as described herein.

Each of the imaging components may capture a set of images. For example, the first imaging component may capture a first set of images 1105 and the second imaging component may capture a second set of images 1107. In some instances, each of the first and second set of images may comprise images captured with a monocular imaging system at different time points. In some instances, the first set of images and the second set of images may be captured substantially simultaneously. The first set of images and/or the second set of images may each be a sequence of images captured over time. In some instances, the second set of images may be better suited for obtaining environmental information. In some instances, the first set of images may have a lower accuracy at edges of the image as compared to the second set of images. In some instances, either the first and/or second set of images may comprise overlapping sets of images obtained with a binocular imaging system.

One or more processors operably coupled with the imaging components may be configured to obtain environmental information. In some instances, the one or more processors may be configured to obtain environmental information by processing data contained in both the first and second set of images, e.g. substantially as described with respect to a binocular imaging system. For example, the one or more processors may obtain environmental information such as depth information by processing a disparity between data contained in the first set of images and the second set of images. In some instances, the one or more processors may be configured to obtain environmental information by processing data contained in the first set of images (e.g. sequence of images), e.g. as described with respect to a monocular imaging system. For example, the one or more processors may obtain environmental information such as depth information by processing a disparity between images in the first set of images. In some instances, the one or more processors may be configured to obtain environmental information by processing data contained in the second set of images (e.g. sequence of images), e.g. as described with respect to a monocular imaging system. For example, the one or more processors may obtain environmental information such as depth information by processing a disparity between images in the second set of images. In some instances, the one or more processors may be configured to obtain environmental information by processing data contained in the second set of images as described with respect to a binocular imaging system. For example, the imaging component 1103 may provide a binocular imaging system and the second set of images may comprise overlapping sets of images itself.

Figure 12:
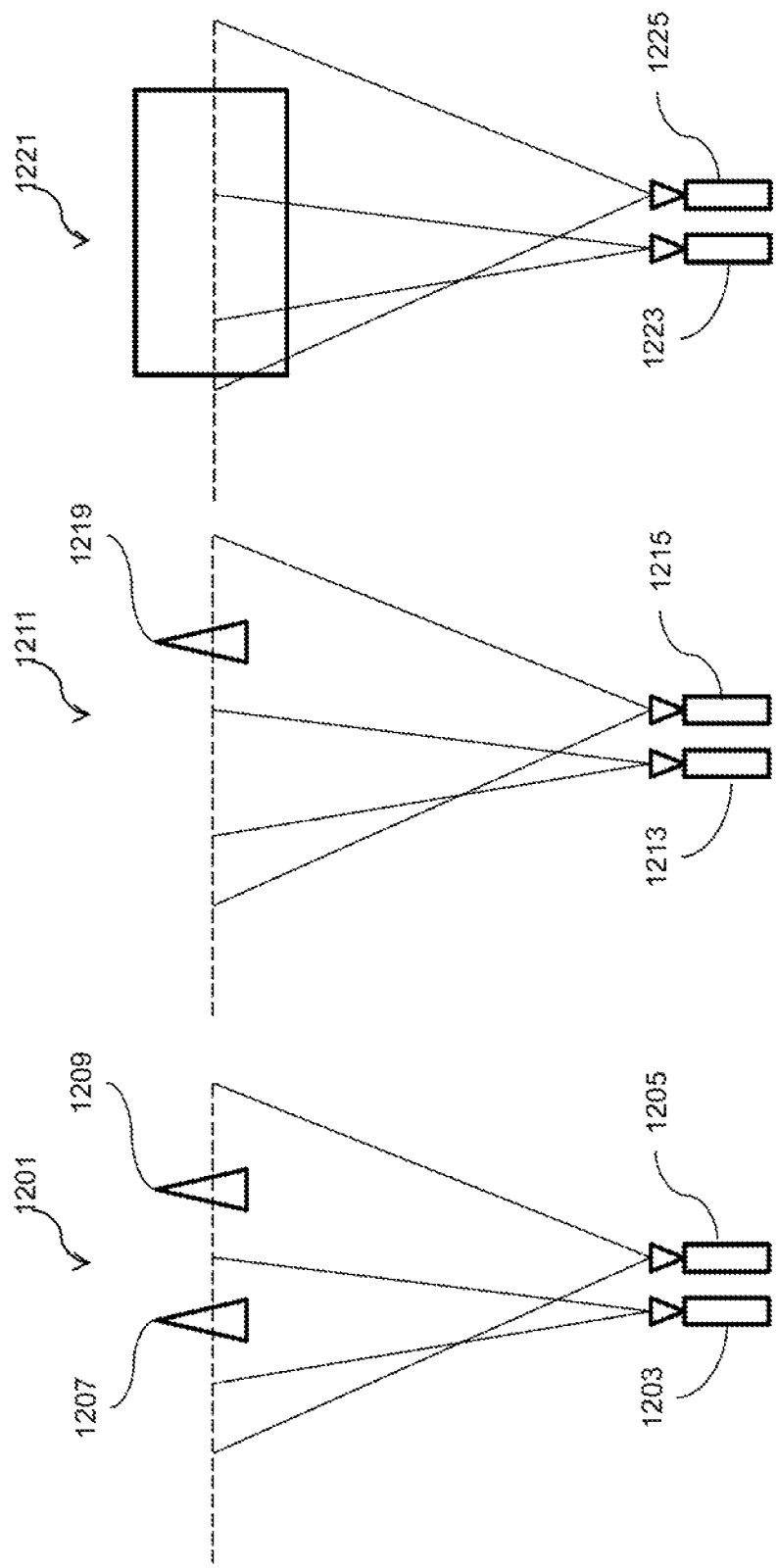
FIG. 12 illustrates exemplary configurations where different imaging systems are utilized, in accordance with embodiments.

FIG. 12 illustrates exemplary configurations where different imaging systems are utilized, in accordance with embodiments. In configuration 1201, an imaging system comprising imaging components 1203, 1205 is supplemented by an imaging system comprising imaging component 1205. Each of the imaging components may provide, or be used as a part of a monocular imaging system and/or a binocular imaging system. The imaging components each capture a set of images (e.g. sequence of images). The substantially simultaneously captured sets of images may comprise an overlapping portion. In some instances, the substantially simultaneously captured sets of images may not comprise an overlapping portion. In some instances, the substantially simultaneously captured sets of images may comprise an overlapping portions and non-overlapping portions. The overlapping portion comprises an object 1207 while the non-overlapping portion comprises an object 1209. One or more processors operably coupled to the imaging components may process an overlapping portion of the images to obtain environmental information for the UAV. For example, the one or more processors may determine a distance to object 1207. This may be possible when the overlapping portion of the images are of sufficient quality. The one or more processors may additionally be configured to process an overlapping portion of the sequence of images captured by imaging component 1205 to obtain environmental information for the UAV, e.g. in the context of a monocular imaging system.

In some instances, by processing images in the context of both binocular imaging systems and monocular imaging systems, the UAV may be able to obtain more accurate and/or precise environmental information. In some instances, by processing images in the context of both binocular imaging systems and monocular imaging systems, the UAV may obtain a greater amount of environmental information. For example, information regarding an obstacle or object 1209 (e.g. distance to object 1209) may be obtained based on the monocular imaging system having a wide field of view while information regarding an obstacle or object 1207 (e.g. distance to object 1207) may be obtained based on the binocular imaging system. The binocular imaging system may provide accurate and precise information of the UAV while the monocular imaging system having a wide field of view may provide supplemental environmental information. The environmental information may further be utilized in operation of the UAV, or in affecting a behavior of the UAV as previously described herein. Optionally, the one or more processors may be configured to obtain environmental information from the monocular imaging system if the binocular imaging system has trouble obtaining environmental information. In configuration 1211, a binocular imaging system comprising imaging components 1213, 1215 is supplemented by a monocular imaging system comprising imaging component 1215. The imaging components each capture a set of images (e.g. sequence of images). The substantially simultaneously captured sets of images may comprise an overlapping portions and non-overlapping portions. The overlapping portion comprises no object while the non-overlapping portion comprises an object 1219. One or more processors operably coupled to the imaging components may process an overlapping portion of the images to obtain environmental information for the UAV. However, the one or more processors may be unable to obtain environmental information from the overlapping portion. For example, there may be insufficient information (e.g. identifiable features, saliency, etc) within the overlapping portion such that environmental information, may not be obtained.

If the overlapping portion has an insufficient quality, the one or more processors may be configured to process an overlapping portion of the sequence of images captured by imaging component 1215 to obtain environmental information for the UAV, e.g. in the context of a monocular imaging system. In some instances, the overlapping portions may have an insufficient quality if there are no identifiable features within the overlapping portions. In some instances, the overlapping portions may have an insufficient quality if there are a few identifiable features within the overlapping portions. In some instances, the data quality in the overlapping portions may have insufficient quality if a distance or depth information cannot be obtained for the UAV. In some instances, the overlapping portions may have insufficient quality if a state information for the UAV such as a velocity or position information cannot not be obtained. In have insufficient quality if a number of feature points within the overlapping portions is equal to or less than about 2, 5, 10, 20, 30, 40, 50, 60, 70, 80, 90, 100, 120, 140, 160, 180, 200, 250, or 300.

In some instances, by processing images in the context of both binocular imaging systems and monocular imaging systems, the UAV may be able to obtain more accurate or precise environmental information when the binocular imaging system is unable to obtain environmental information. In some instances, by processing images in the context of both binocular imaging systems and monocular imaging systems, the UAV may obtain a greater amount of environmental information when the binocular imaging system is unable to obtain environmental information. For example, information regarding an obstacle or object 1219 (e.g. distance to object 1219) may be obtained based on the monocular imaging system having a wide field of view when the binocular imaging system is unable to obtain environmental information. The environmental information may further be utilized in operation of the UAV, or in affecting a behavior of the UAV as previously described herein.

In configuration 1221, a binocular imaging system comprising imaging components 1223, 1225 is supplemented by a monocular imaging system comprising imaging component 1225. The imaging components each capture a set of images (e.g. sequence of images). The substantially simultaneously captured sets of images may comprise an overlapping portions and non-overlapping portions. The overlapping portion comprises a portion of an object having no distinguishing features while the non-overlapping portions comprise a portion of the object with distinguishing features. Accordingly, substantially as described with respect to configuration 1211, the monocular imaging system may be used as a supplement and/or alternative to the binocular imaging system.

Figure 13:
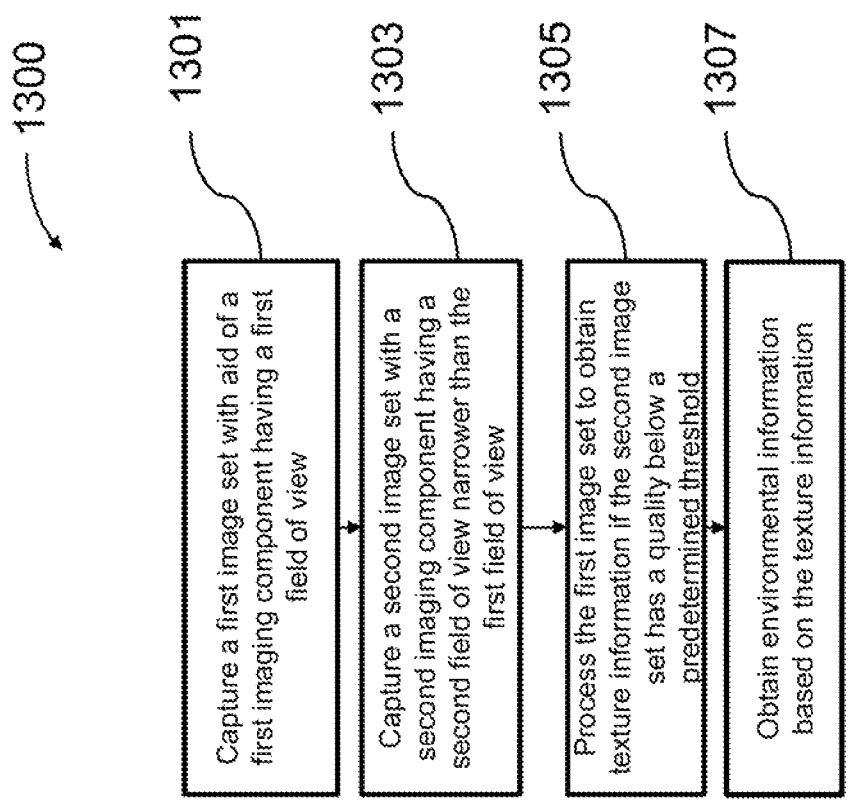
FIG. 13 illustrates a method for processing images captured by a movable object, in accordance with embodiments.

FIG. 13 illustrates a method for processing images captured by a movable object, in accordance with embodiments. The movable object may be an unmanned aerial vehicle (UAV) as previously described herein. Alternatively, the movable object may be any other type of vehicle. The movable object may in some instances be operably coupled to an imaging component. For example, the imaging component may be located on-board the movable object. In some instances, the imaging component may be embedded, or be integrated with the movable object. The imaging component may form a monocular imaging system.

In step 1301, a first image set is captured with a first imaging component. The first imaging component may comprise a first lens system. The first imaging component may be located on an imaging device. The first imaging component may be located on board the movable object. In some instances, the first image set may comprise a sequence of images. The first imaging component may have a first field of view. In some instances, the first field of view may have an angle of view between about 90° and 180°.

In step 1303, a second image set is captured with a second imaging component. The second imaging component may comprise a second lens system. The second imaging component may be located on an imaging device. In some instances, the second imaging component may be located on a different imaging device from the first imaging component. Alternatively, the second imaging component may be located on a same imaging device as the first imaging component. The second imaging component may be located on board the movable object. The second imaging component may have a second field of view. The second field of view may be narrower than the first field of view in some instances. In some instances, the first field of view and the second field of view may be overlapping. In some instances, the second field of view is encompassed by the first field of view. In some instances, the second field of view may have an angle of view between about 50° and 80°. Each of the first imaging component and the second imaging component may comprise a monocular lens system.

In some instances, one or more processors may be provided. The one or more processors may be located on-board the movable object. Alternatively or in addition, some, or all of the one or more processors may be located off-board the movable object. For example, parts of the processors may be located on a remote controller or mobile device operably coupled to the movable object. The one or more processors may individually or collective process the first image set to obtain texture information in step 1305. The texture information may provide information regarding a spatial arrangement of color or intensities in an image. The texture information may be obtained from both overlapping and/or non-overlapping portions of the sequence of images obtained by imaging component. In some instances, the one or more processors may process the first image set to obtain texture information if the second image set has a quality below a predetermined threshold. Alternatively or in addition, the one or more processors may be configured to process the second image set to obtain environmental information for the movable object if the quality of the second image set is above the predetermined threshold. The one or more processors may be configured to analyze a saliency or gradient of images of the second image set in order determine the quality of the second image set. In some instances, the one or more processors may be configured to analyze a feature point number or optical flow within the second image set in order to determine the quality of the second image set.

In step 1307, the one or more processors may obtain environmental information for the movable object based on the texture information obtained in step 1305. In some instances, the environmental information comprises depth information. Alternatively or in addition, the environmental information comprises obstacle information or state information of the movable object. In some instances, the one or more processors may be configured not to process the first image set to obtain environmental information for the movable object if the quality of the second image is above the predetermined threshold.

Optionally, the one or more processors may further be configured to generate a control signal to control a position and/or orientation of the movable object based on the obtained environmental information. Alternatively or in addition, the one or more processors may further be configured to generate a control signal to control a position and/or orientation of an imaging device coupled to the movable object relative to the movable object based on the obtained environmental information. In some instances, the one or more processors may be configured to generate a control signal to adjust an optical axis of the second imaging component if the quality of the second image set is below the predetermined threshold. The control signal may depend on the texture information of the first image set.

In some instances, the one or more processors may be configured to repeat the processing and obtaining steps during flight of the movable object. The processing and obtaining steps may be repeated at least every 60 seconds, 30 seconds, 10 seconds, 5 seconds, 4 seconds, 3 seconds, 2 seconds, 1 second, 0.5 seconds, 0.3 seconds, 0.1 second, 0.05 seconds, or 0.01 seconds.

In some instances, a system may be provided for implementing the method 1300. The system may comprise one or more processors, individually or collectively configured to: process a first image set to obtain texture information if a second image set has a quality below a predetermined threshold, wherein the first image set is captured by a first imaging component having a first field of view and wherein the second image set is captured by a second imaging component having a second field of view narrower than the first field of view; and obtain environmental information for the movable object based on the texture information.

In some instances, an apparatus may be provided for implementing the method 1300. The apparatus may comprise a first imaging component having a first field of view, wherein the first imaging component is configured to capture a first image set; a second imaging component having a second field of view narrower than the first field of view, wherein the second imaging component is configured to capture a second image set; and one or more processors, individually or collectively configured to: process the first image set to obtain texture information if the second image set has a quality below a predetermined threshold; and obtain environmental information for the movable object based on the texture information.

In some instances, a non-transitory computer readable medium may be provided for implementing the method 1300. The non-transitory computer readable medium may comprise code, logic, or instructions to capture a first image set with a first imaging component, wherein the first imaging component has a first field of view; capture a second image set with a second imaging component, wherein the second imaging component has a second field of view narrower than the first field of view; with aid of one or more processors, individually or collectively, process the first image set to obtain texture information if the second image set has a quality below a predetermined threshold; and obtain environmental information for the movable object based on the texture information.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 14:
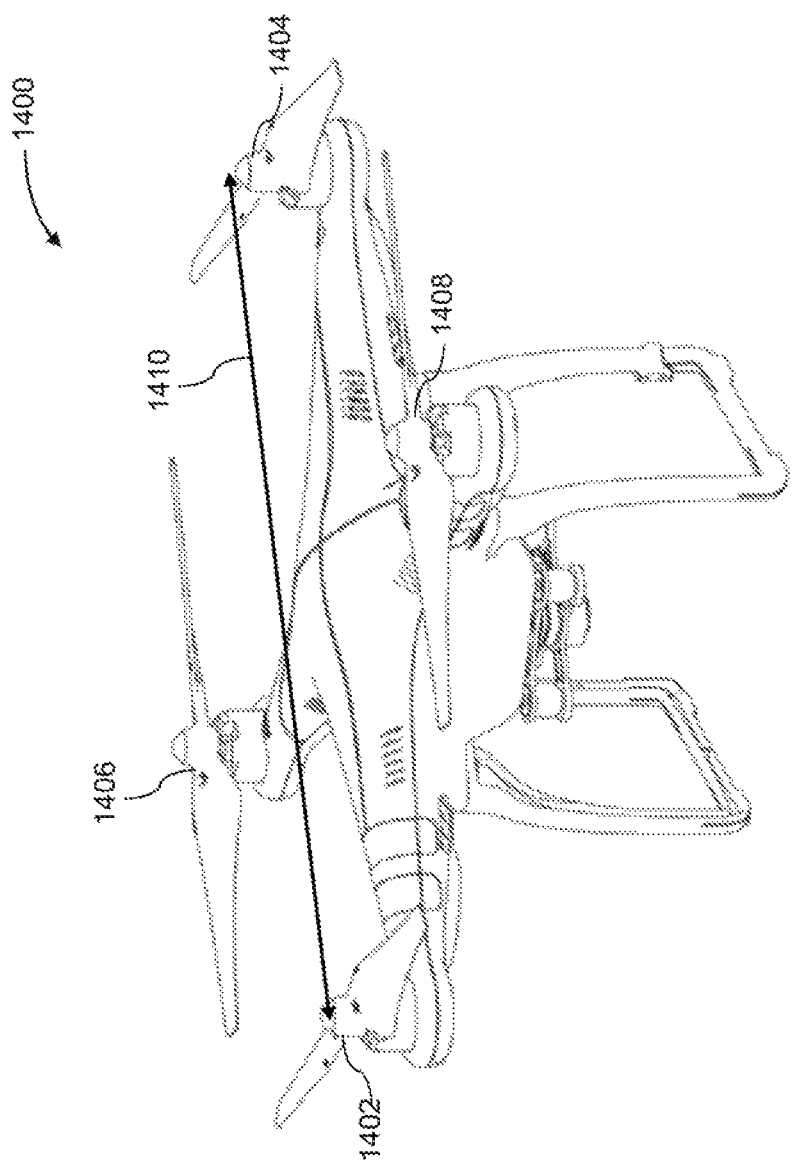
FIG. 14 illustrates an appearance of UAV in accordance with embodiments of the present disclosure.

FIG. 14 illustrates an unmanned aerial vehicle (UAV) 1400, in accordance with embodiments of the present disclosure. The UAV may be an example of a movable object as described herein, to which the method and apparatus of discharging a battery assembly may be applied. The UAV 1400 can include a propulsion system having four rotors 1402, 1404, 1406, and 1408. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1410. For example, the length 1410 can be less than or equal to 2 m, or less than equal to 5 m. In some embodiments, the length 1410 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 15:
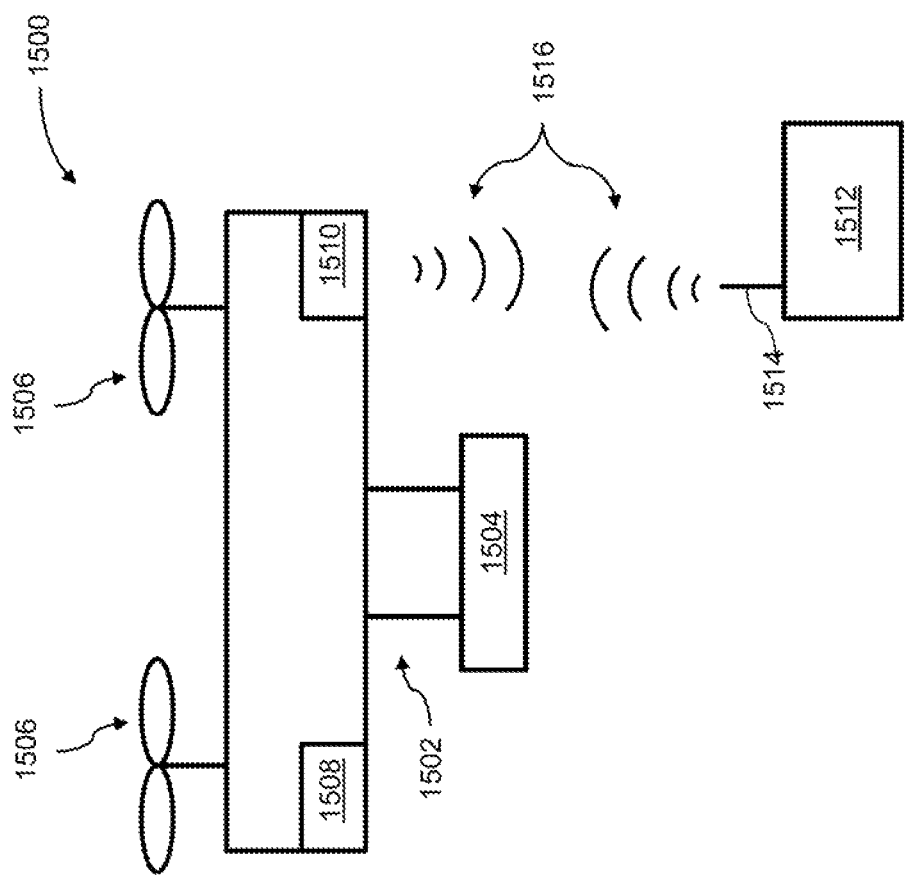
FIG. 15 illustrates a movable object including a carrier and a payload, in accordance with embodiments of the present disclosure.

FIG. 15 illustrates a movable object 1500 including a carrier 1502 and a payload 1504, in accordance with embodiments of the present disclosure. Although the movable object 1500 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1504 may be provided on the movable object 1500 without requiring the carrier 1502. The movable object 1500 may include propulsion mechanisms 1506, a sensing system 1508, and a communication system 1510.

The propulsion mechanisms 1506 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1506 can be mounted on the movable object 1500 using any suitable means, such as a support element (e.g., a drive shaft) as described elsewhere herein. The propulsion mechanisms 1506 can be mounted on any suitable portion of the movable object 1500, such on the top, bottom, front, back, sides, or suitable combinations thereof.

In some embodiments, the propulsion mechanisms 1506 can enable the movable object 1500 to take off vertically from a surface or land vertically on a surface without requiring any horizontal movement of the movable object 1500 (e.g., without traveling down a runway). Optionally, the propulsion mechanisms 1506 can be operable to permit the movable object 1500 to hover in the air at a specified position and/or orientation. One or more of the propulsion mechanisms 1500 may be controlled independently of the other propulsion mechanisms. Alternatively, the propulsion mechanisms 1500 can be configured to be controlled simultaneously. For example, the movable object 1500 can have multiple horizontally oriented rotors that can provide lift and/or thrust to the movable object. The multiple horizontally oriented rotors can be actuated to provide vertical takeoff, vertical landing, and hovering capabilities to the movable object 1500. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1500 (e.g., with respect to up to three degrees of translation and up to three degrees of rotation).

The sensing system 1508 can include one or more sensors that may sense the spatial disposition, velocity, and/or acceleration of the movable object 1500 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1508 can be used to control the spatial disposition, velocity, and/or orientation of the movable object 1500 (e.g., using a suitable processing unit and/or control module, as described below). Alternatively, the sensing system 1508 can be used to provide data regarding the environment surrounding the movable object, such as weather conditions, proximity to potential obstacles, location of geographical features, location of manmade structures, and the like.

The communication system 1510 enables communication with terminal 1512 having a communication system 1514 via wireless signals 1516. The communication systems 1510, 1514 may include any number of transmitters, receivers, and/or transceivers suitable for wireless communication. The communication may be one-way communication, such that data can be transmitted in only one direction. For example, one-way communication may involve only the movable object 1500 transmitting data to the terminal 1512, or vice-versa. The data may be transmitted from one or more transmitters of the communication system 1510 to one or more receivers of the communication system 1512, or vice-versa. Alternatively, the communication may be two-way communication, such that data can be transmitted in both directions between the movable object 1500 and the terminal 1512. The two-way communication can involve transmitting data from one or more transmitters of the communication system 1510 to one or more receivers of the communication system 1514, and vice-versa.

In some embodiments, the terminal 1512 can provide control data to one or more of the movable object 1500, carrier 1502, and payload 1504 and receive information from one or more of the movable object 1500, carrier 1502, and payload 1504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1506), or a movement of the payload with respect to the movable object (e.g., via control of the carrier 1502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1508 or of the payload 1504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1512 can be configured to control a state of one or more of the movable object 1500, carrier 1502, or payload 1504. Alternatively or in combination, the carrier 1502 and payload 1504 can also each include a communication module configured to communicate with terminal 1512, such that the terminal can communicate with and control each of the movable object 1500, carrier 1502, and payload 1504 independently.

In some embodiments, the movable object 1500 can be configured to communicate with another remote device in addition to the terminal 1512, or instead of the terminal 1512. The terminal 1512 may also be configured to communicate with another remote device as well as the movable object 1500. For example, the movable object 1500 and/or terminal 1512 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1500, receive data from the movable object 1500, transmit data to the terminal 1512, and/or receive data from the terminal 1512. Optionally, the remote device can be connected to the Internet or other telecommunications network, such that data received from the movable object 1500 and/or terminal 1512 can be uploaded to a website or server.

Figure 16:
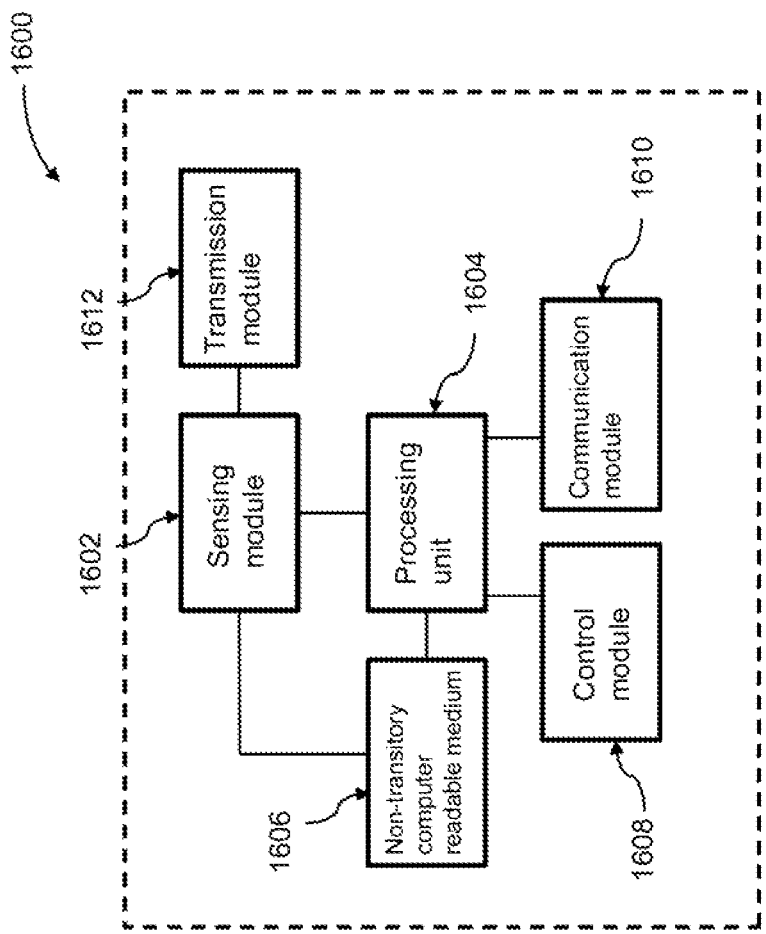
FIG. 16 is a schematic illustration by way of block diagram of a system for controlling a movable object, in accordance with embodiments of the present disclosure.

FIG. 16 is a schematic illustration by way of block diagram of a system 1600 for controlling a movable object, in accordance with embodiments of the present disclosure. The system 1600 can be used in combination with any suitable embodiment of the systems, devices, and methods disclosed herein. The system 1600 can include a sensing module 1602, processing unit 1604, non-transitory computer readable medium 1606, control module 1608, and communication module 1610.

The sensing module 1602 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1602 can be operatively coupled to a processing unit 1604 having a plurality of processors. In some embodiments, the sensing module can be operatively coupled to a transmission module 1612 (e.g., a Wi-Fi image transmission module) configured to directly transmit sensing data to a suitable external device or system. For example, the transmission module 1612 can be used to transmit images captured by a camera of the sensing module 1602 to a remote terminal.

The processing unit 1604 can have one or more processors, such as a programmable processor (e.g., a central processing unit (CPU)). The processing unit 1604 can be operatively coupled to a non-transitory computer readable medium 1606. The non-transitory computer readable medium 1606 can store logic, code, and/or program instructions executable by the processing unit 1604 for performing one or more steps. The non-transitory computer readable medium can include one or more memory units (e.g., removable media or external storage such as an SD card or random access memory (RAM)). In some embodiments, data from the sensing module 1602 can be directly conveyed to and stored within the memory units of the non-transitory computer readable medium 1606. The memory units of the non-transitory computer readable medium 1606 can store logic, code and/or program instructions executable by the processing unit 1604 to perform any suitable embodiment of the methods described herein. For example, the processing unit 1604 can be configured to execute instructions causing one or more processors of the processing unit 1604 to analyze sensing data produced by the sensing module. The memory units can store sensing data from the sensing module to be processed by the processing unit 1604. In some embodiments, the memory units of the non-transitory computer readable medium 1606 can be used to store the processing results produced by the processing unit 1604.

In some embodiments, the processing unit 1604 can be operatively coupled to a control module 1608 configured to control a state of the movable object. For example, the control module 1608 can be configured to control the propulsion mechanisms of the movable object to adjust the spatial disposition, velocity, and/or acceleration of the movable object with respect to six degrees of freedom. Alternatively or in combination, the control module 1608 can control one or more of a state of a carrier, payload, or sensing module.

The processing unit 1604 can be operatively coupled to a communication module 1610 configured to transmit and/or receive data from one or more external devices (e.g., a terminal, display device, or other remote controller). Any suitable means of communication can be used, such as wired communication or wireless communication. For example, the communication module 1610 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1610 can transmit and/or receive one or more of sensing data from the sensing module 1602, processing results produced by the processing unit 1604, predetermined control data, user commands from a terminal or remote controller, and the like.

The components of the system 1600 can be arranged in any suitable configuration. For example, one or more of the components of the system 1600 can be located on the movable object, carrier, payload, terminal, sensing system, or an additional external device in communication with one or more of the above. Additionally, although FIG. 16 depicts a single processing unit 1604 and a single non-transitory computer readable medium 1606, one of skill in the art would appreciate that this is not intended to be limiting, and that the system 1600 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1600 can occur at one or more of the aforementioned locations.

While some embodiments of the present disclosure have been shown and described herein, it will be obvious to those skilled in the art that such embodiments are provided by way of example only. All elements described in the context of system applies to the practice of the subject methods, and vice versa. Numerous variations, changes, and substitutions will now occur to those skilled in the art without departing from the present disclosure. It should be understood that various alternatives to the embodiments of the present disclosure described herein may be employed in practicing the invention. It is intended that the following claims define the scope of the present invention and that methods and structures within the scope of these claims and their equivalents be covered thereby.

What is claimed is:

1. A system for processing images captured by a movable object, the system comprising:
   one or more processors, individually or collectively configured to:
     process a non-overlapping portion of a first image set and a second image set to obtain texture information, wherein the first image set is captured by a first imaging component having a first field of view and the second image set is captured by a second imaging component having a second field of view overlapping with the first field of view; and
     generate a control signal to adjust the first imaging component and the second imaging component based on the texture information.

2. The system of claim 1, wherein the one or more processors are further configured to analyze an overlapping portion of the first image set and the second image set to obtain environmental information for the movable object.

3. The system of claim 1, wherein the movable object is an unmanned aerial vehicle (UAV), the first imaging component comprises a first lens system, and the second imaging component comprises a second lens system.

4. The system of claim 1, wherein the control signal provides an instruction for adjustment of the movable object, thereby adjusting the first imaging component and/or the second imaging component.

5. The system of claim 4, wherein the adjustment of the movable object is an adjustment of an orientation of the movable object with respect to its pitch, yaw, or roll axis.

6. The system of claim 1, wherein the control signal provides an instruction for adjustment of an optical axis of the first imaging component and/or the second imaging component.

7. The system of claim 1, wherein the one or more processors are further configured to obtain environmental information for the movable object based on the texture information if an overlapping portion of the first image set and the second image set has a quality below a predetermined threshold.

8. The system of claim 7, wherein the environmental information comprises depth information.

9. The system of claim 7, wherein the environmental information comprises obstacle information or state information of the movable object.

10. The system of claim 7, wherein the one or more processors are configured to analyze a saliency or gradient of images of the overlapping portion in order determine the quality of the overlapping portion, or to analyze a feature point number or optical flow within the overlapping portion in order to determine the quality of the overlapping portion.

11. The system of claim 1, wherein the adjustment of the first imaging component and/or the second imaging component is configured to be such that a new overlapping portion of the first field of view and the second field of view encompasses at least a portion of the non-overlapping portion of the first image set and the second image set.

12. The system of claim 1, wherein the adjustment of the first imaging component and/or the second imaging component is configured to be such that a new overlapping portion of the first field of view and the second field of view has a different size than a previous overlapping portion.

13. The system of claim 1, wherein the first imaging component and the second imaging component have substantially parallel optical axes.

14. A method of processing images captured by a movable object, the method comprising:
- capturing a first image set with a first imaging component, wherein the first imaging component has a first field of view;
- capturing a second image set with a second imaging component, wherein the second imaging component has a second field of view overlapping with the first field of view;
- processing a non-overlapping portion of the first image set and the second image set to obtain texture information; and
- generating a control signal to adjust the first imaging component and the second imaging component based on the texture information.

15. The method of claim 14, further comprising:
analyzing an overlapping portion of the first image set and the second image set to obtain environmental information for the movable object.

16. The method of claim 14, further comprising:
obtaining environmental information for the movable object based on the texture information if an overlapping portion of the first image set and the second image set has a quality below a predetermined threshold.

17. The method of claim 14, further comprising:
analyzing a feature point number or optical flow within the overlapping portion in order to determine the quality of the overlapping portion.

18. The method of claim 14, further comprising:
analyzing a saliency or gradient of images of the overlapping portion in order to determine the quality of the overlapping portion.

19. An apparatus for processing images captured by a movable object, the apparatus comprising:
- a first imaging component having a first field of view, wherein the first imaging component is configured to capture a first image set;
- a second imaging component having a second field of view overlapping with the first field of view, wherein the second imaging component is configured to capture a second image set; and one or more processors, individually or collectively configured to:
  - process a non-overlapping portion of the first image set and the second image set to obtain texture information; and
  - generate a control signal to adjust the first imaging component and/or the second imaging component based on the texture information.

20. The apparatus of claim 19, the one or more processors are further configured to:
- obtain environmental information for the movable object based on the texture information if an overlapping portion of the first image set and the second image set has a quality below a predetermined threshold; and
- analyze a feature point number or optical flow within the overlapping portion in order to determine the quality of the overlapping portion.

* * * * *